United States Patent
Donnerdal et al.

(10) Patent No.: US 8,215,295 B2
(45) Date of Patent: Jul. 10, 2012

(54) CUTTING OR SAWING MACHINE

(75) Inventors: Ove Donnerdal, Sävedalen (SE); Håkan Pinzani, Göteborg (SE); Mari Albinsson, Göteborg (SE)

(73) Assignee: Husqvarna AB, Huskvarna (SE)

( * ) Notice: Subject to any disclaimer, the term of this patent is extended or adjusted under 35 U.S.C. 154(b) by 350 days.

(21) Appl. No.: 12/502,341

(22) Filed: Jul. 14, 2009

(65) Prior Publication Data

US 2010/0175676 A1 Jul. 15, 2010

Related U.S. Application Data

(63) Continuation of application No. 11/626,361, filed on Jan. 23, 2007, now Pat. No. 7,571,720, which is a continuation of application No. PCT/SE2005/000421, filed on Mar. 23, 2005.

(51) Int. Cl.
*B23D 45/10* (2006.01)

(52) U.S. Cl. ..... 125/13.01; 30/503.5; 30/388; 83/425.3; 83/877; 125/13.03

(58) Field of Classification Search ............ 30/503.5, 30/388; 83/425.3, 864, 876, 877, 878, 666, 83/673, 676; 125/13.01, 13.03, 14; 144/237, 144/238, 222; 299/39.3
See application file for complete search history.

(56) References Cited

U.S. PATENT DOCUMENTS

| | | | |
|---|---|---|---|
| 3,513,888 A * | 5/1970 | Townsend et al. | 30/390 |
| 3,583,106 A | 6/1971 | Dobbertin | |
| 3,735,489 A | 5/1973 | Zatorsky, Jr. | |
| 3,893,240 A | 7/1975 | Morner et al. | |
| 4,646,607 A | 3/1987 | Johansson | |
| 4,717,205 A * | 1/1988 | Sasage | 125/3 |
| 4,809,438 A | 3/1989 | Nagashima et al. | |
| 4,972,769 A * | 11/1990 | Cailliot | 99/593 |
| 5,020,280 A * | 6/1991 | O'Reilly | 451/342 |
| 5,027,517 A * | 7/1991 | Reuter | 30/265 |
| 5,128,641 A | 7/1992 | Posey | |
| 5,887,579 A | 3/1999 | Eriksson et al. | |
| 6,874,400 B2 | 4/2005 | Johansson | |

(Continued)

FOREIGN PATENT DOCUMENTS

CH 460127 9/1968

(Continued)

OTHER PUBLICATIONS

International Search Report dated Aug. 29, 2005 from International Application PCT/SE2005/000744, pp. 1-2.

(Continued)

*Primary Examiner* — Timothy V Eley
(74) *Attorney, Agent, or Firm* — Novak Druce + Quigg LLP

(57) ABSTRACT

A rotatable cutting tool unit of a tool assembly for a cutting machine that is used in conjunction with an associated method of cutting provides several novel aspects. The tool arrangement, which includes two tool units, includes first and second disk-shaped tools rotatable about an axis. The tools define maximum tool arrangement boundaries along the axis. A driving arrangement, at an axial location between the first and second tools, supports the first and second tools for rotation and transfers driving force. A radially outer periphery of the driving arrangement is at a radius less than a radius of a peripheral cutting edge portion of the first tool and less than a radius of a peripheral cutting edge portion of the second tool.

10 Claims, 25 Drawing Sheets

U.S. PATENT DOCUMENTS

| | | |
|---|---|---|
| 7,059,947 B2 | 6/2006 | Crover |
| 7,131,897 B2 | 11/2006 | Crover |
| 7,137,877 B2 | 11/2006 | Uhl et al. |
| 7,143,759 B1 * | 12/2006 | Wang .................. 125/13.01 |
| 7,571,720 B2 | 8/2009 | Donnerdal et al. |
| 2004/0033393 A1 | 2/2004 | Nordgren et al. |
| 2004/0033852 A1 | 2/2004 | Taomo et al. |
| 2010/0299944 A1 | 12/2010 | Hellberg |

FOREIGN PATENT DOCUMENTS

| | | |
|---|---|---|
| DE | 1810153 | 6/1969 |
| EP | 1252956 A1 | 10/2002 |
| FR | 1404208 | 8/1964 |
| SE | 517165 C2 | 4/2002 |
| WO | 01/23157 A2 | 4/2001 |

OTHER PUBLICATIONS

International Search Report dated Oct. 6, 2005 from International Application PCT/SE2005/000421, pp. 1-2.

Office Action, U.S. Appl. No. 11/909,602, mailed Nov. 16, 2011, pp. 1-12.

* cited by examiner

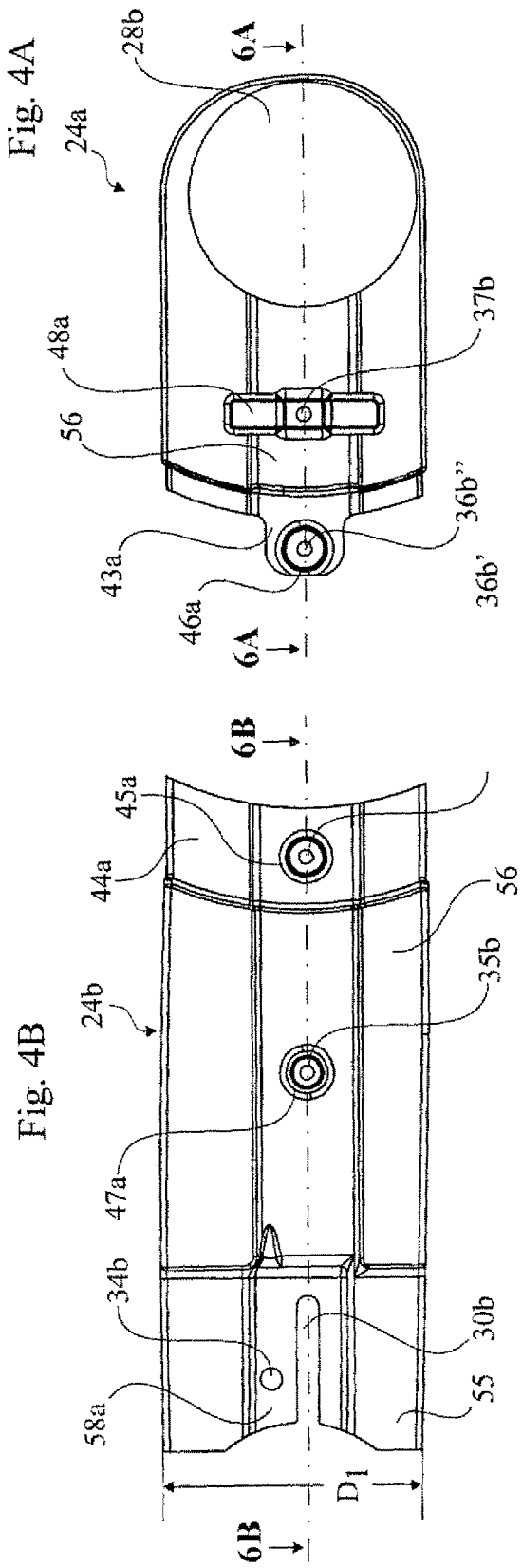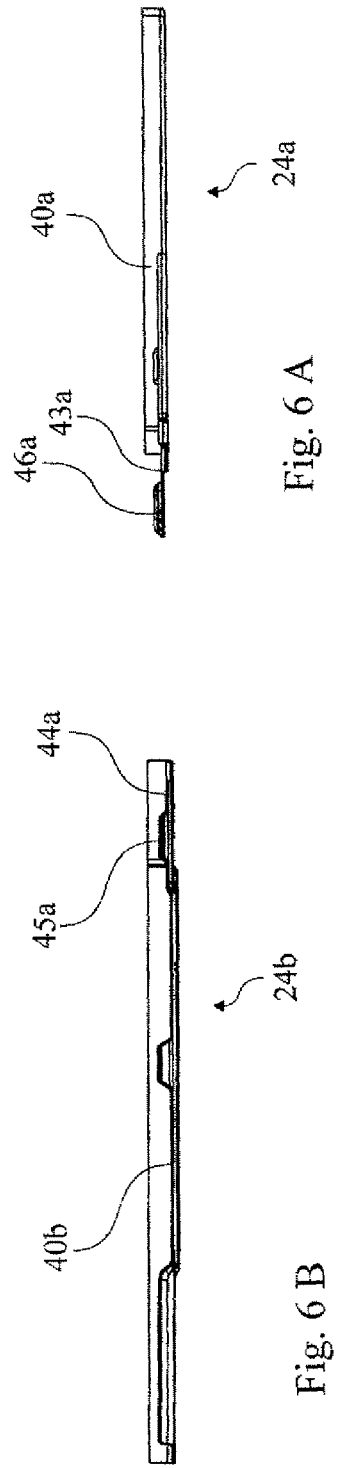

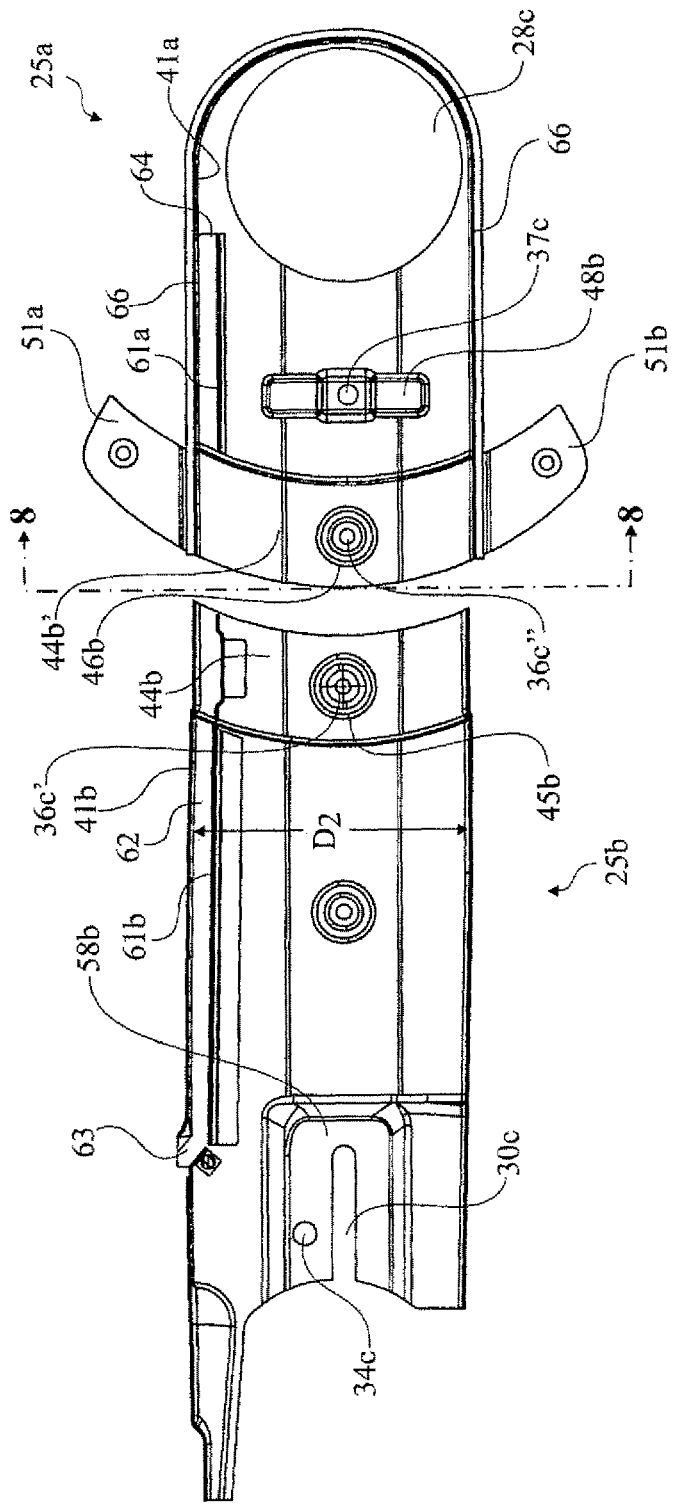

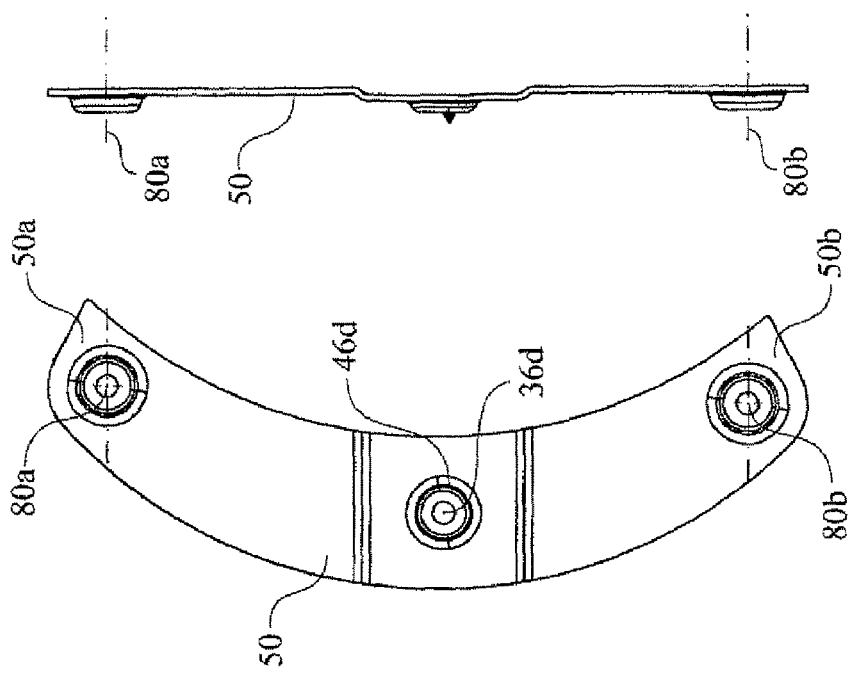
Fig. 10
Fig. 9
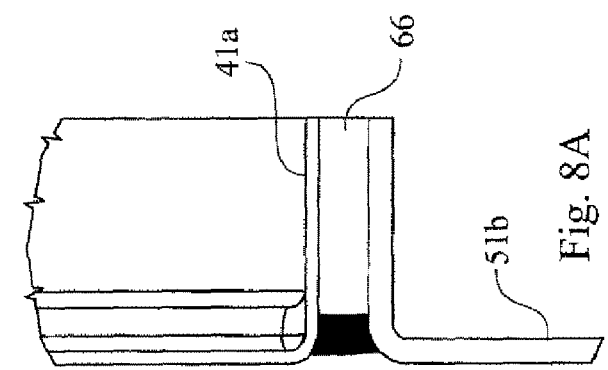
Fig. 8A
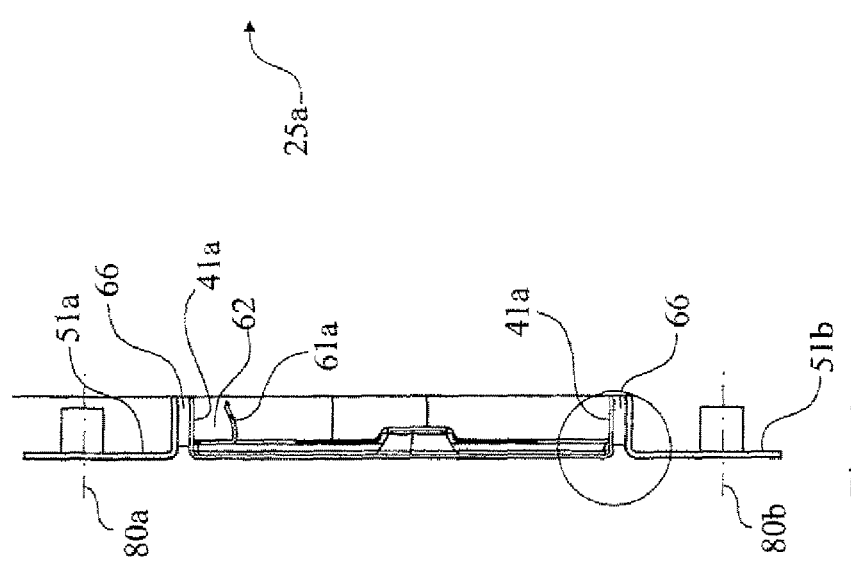
Fig. 8

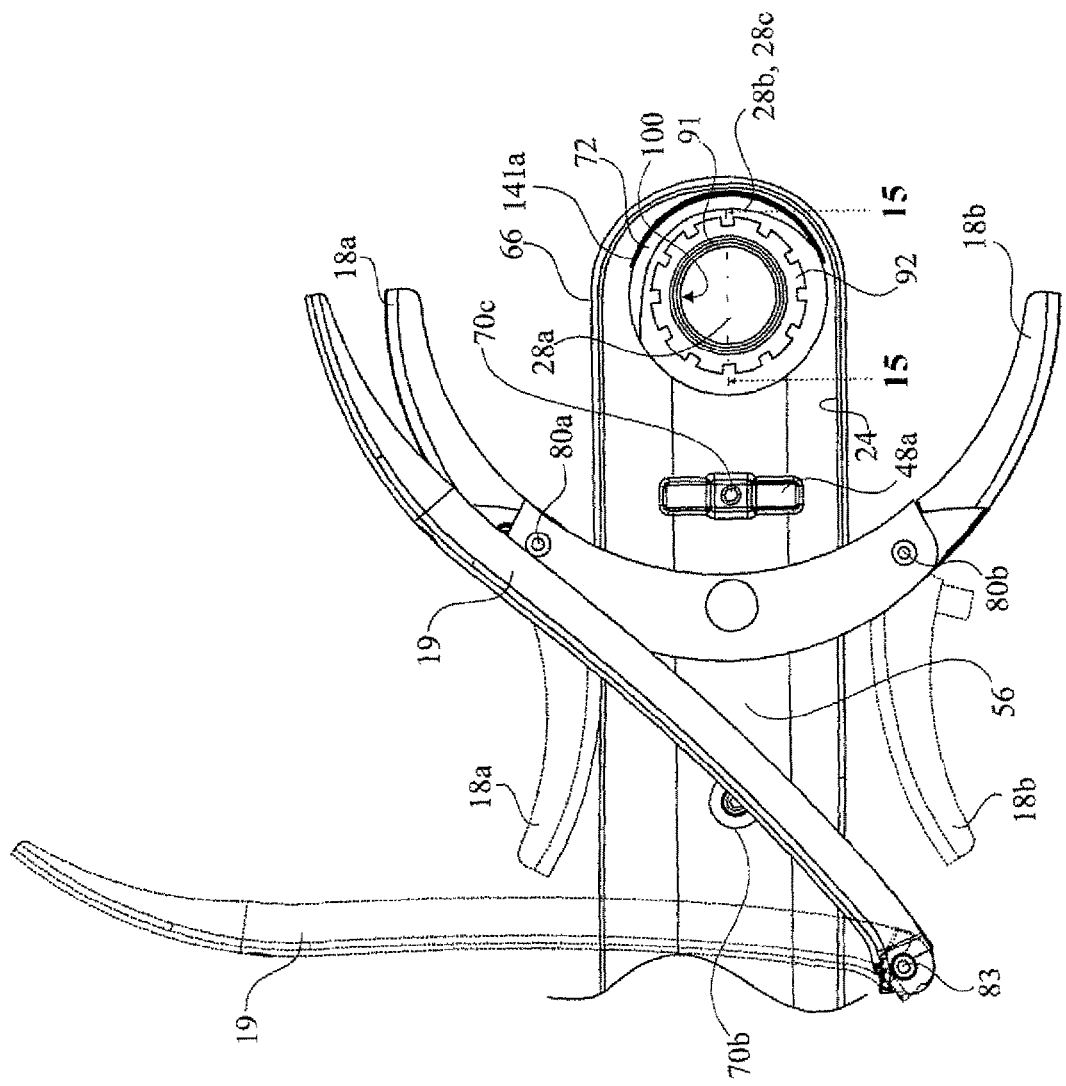

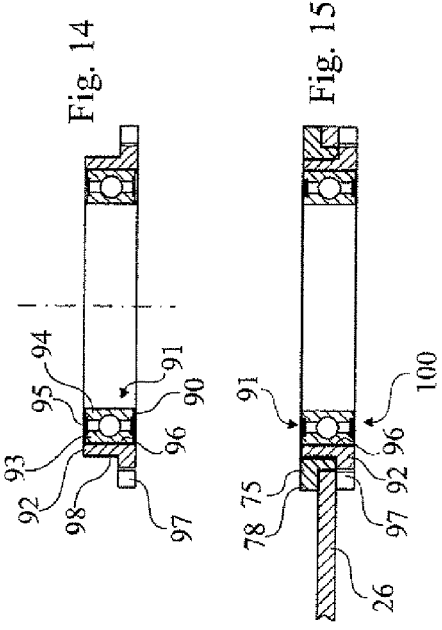
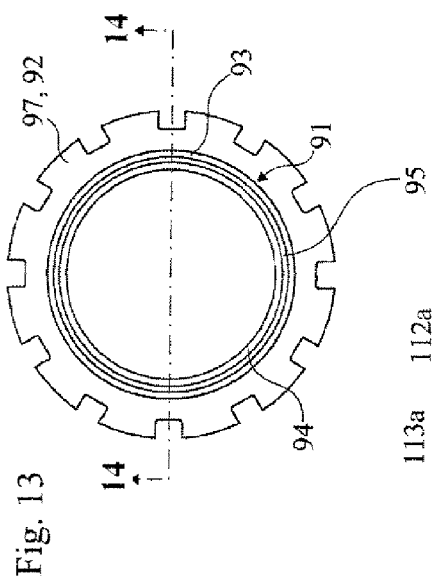
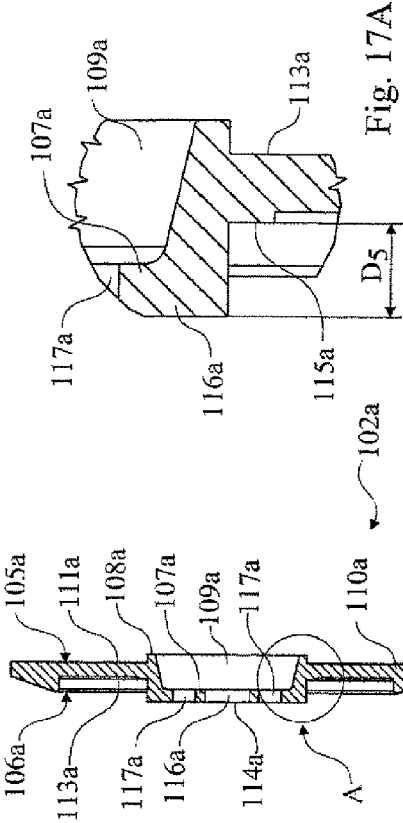
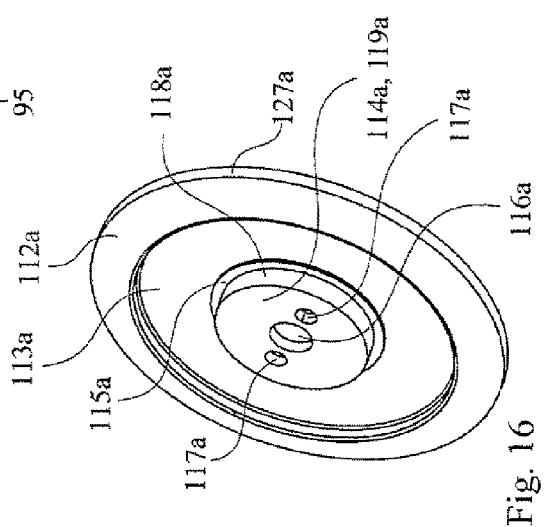

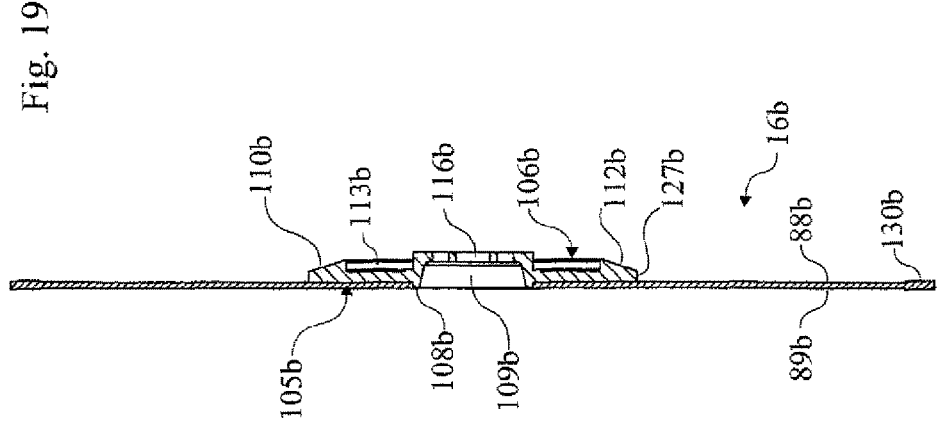
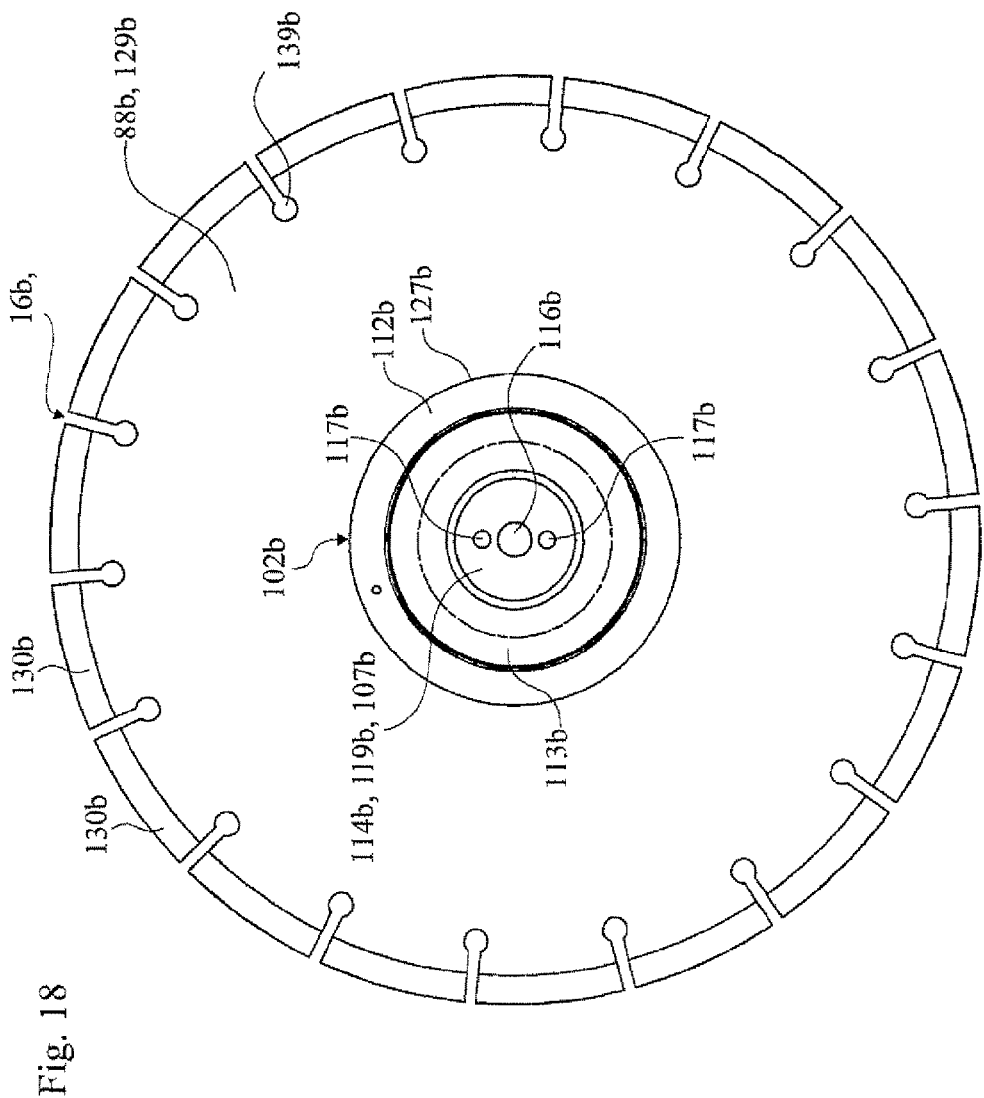

Fig. 22
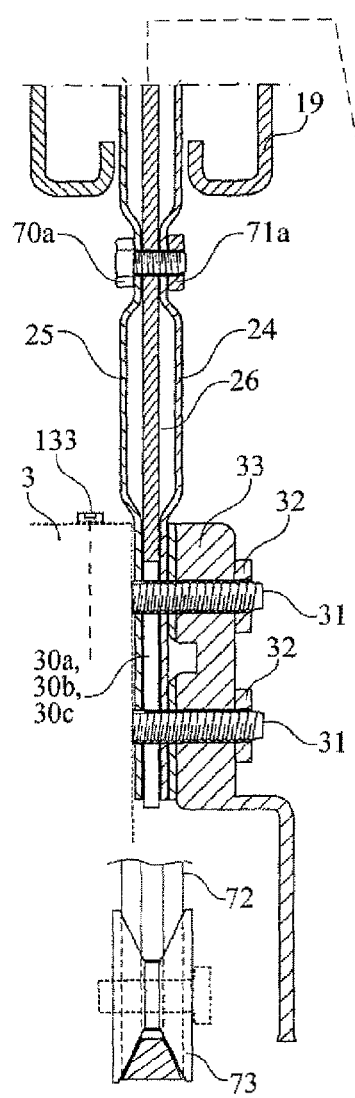
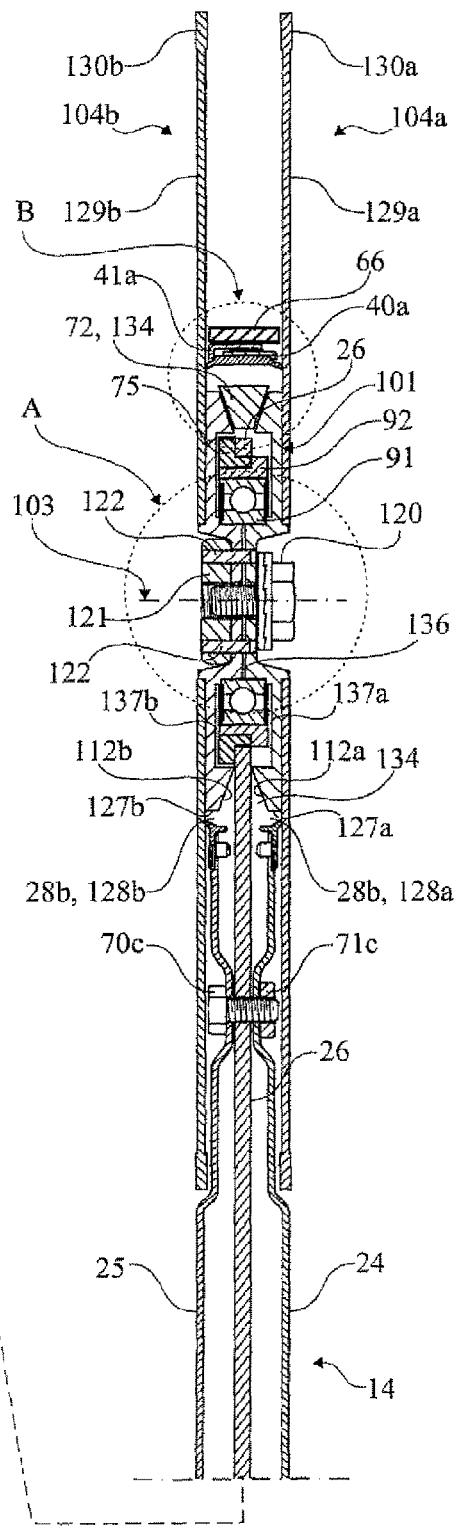

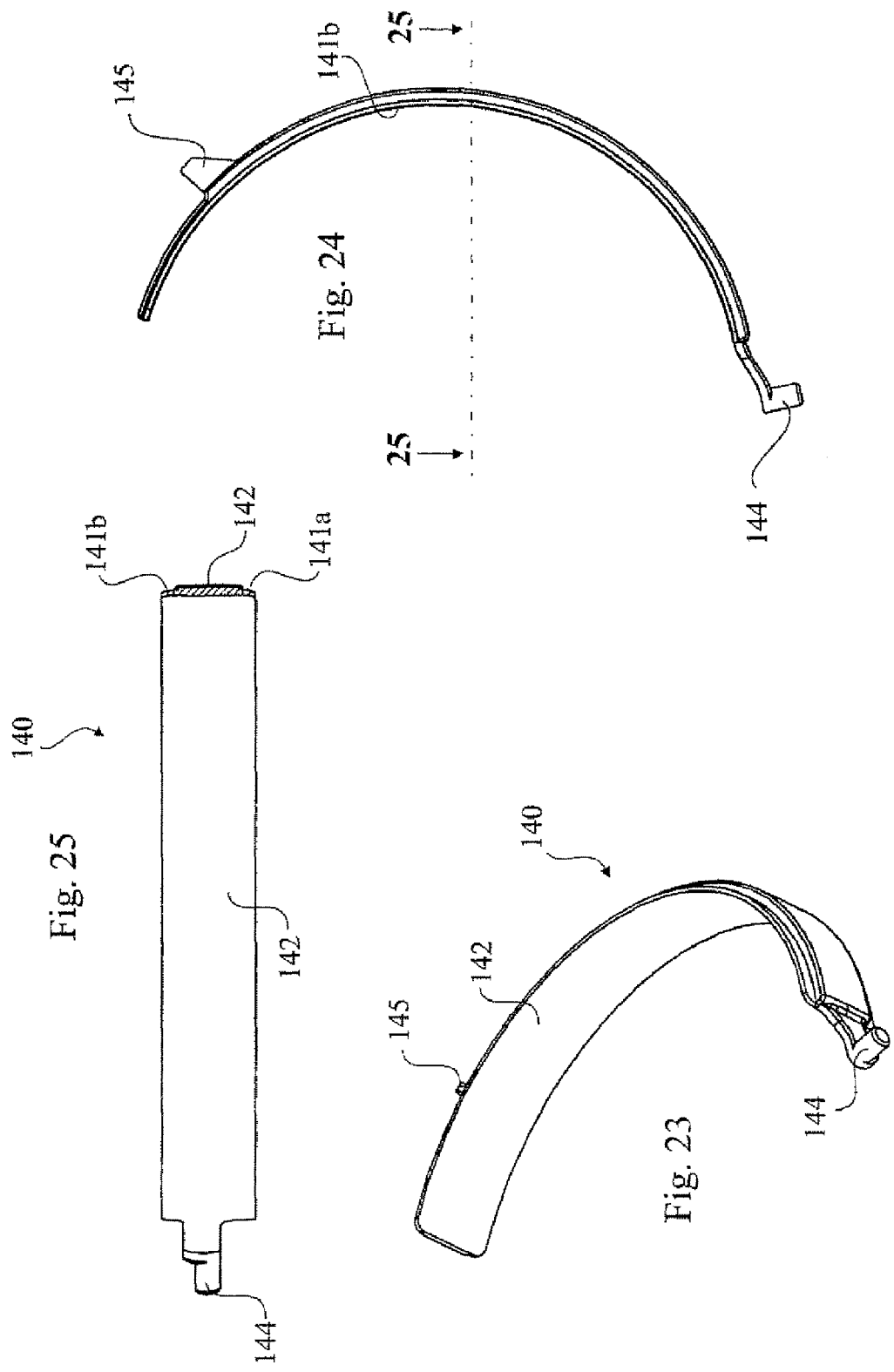

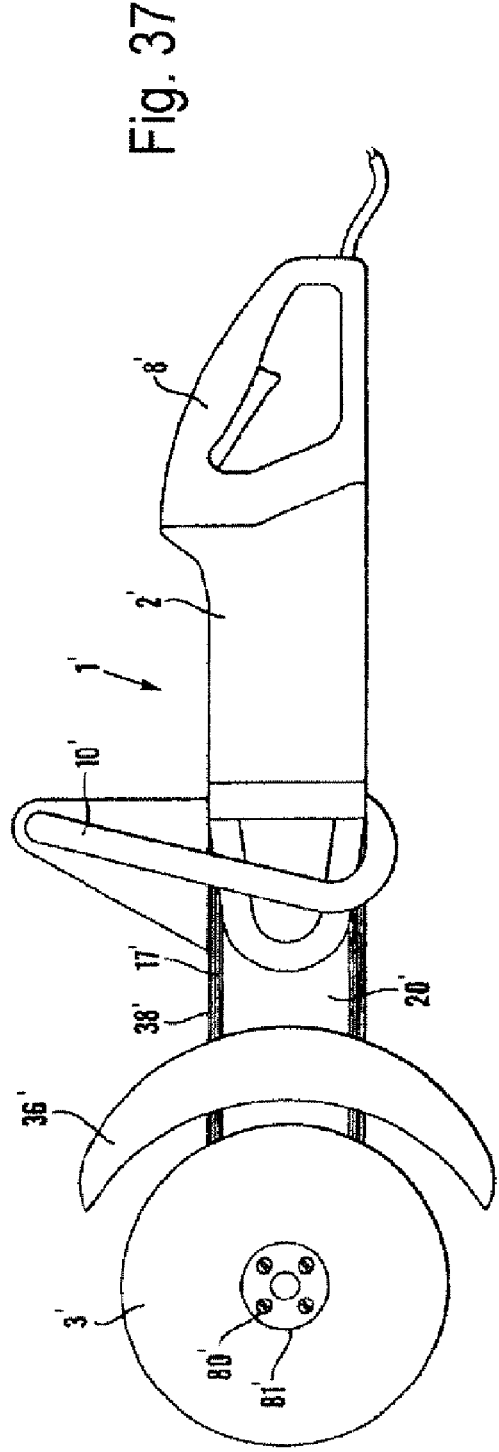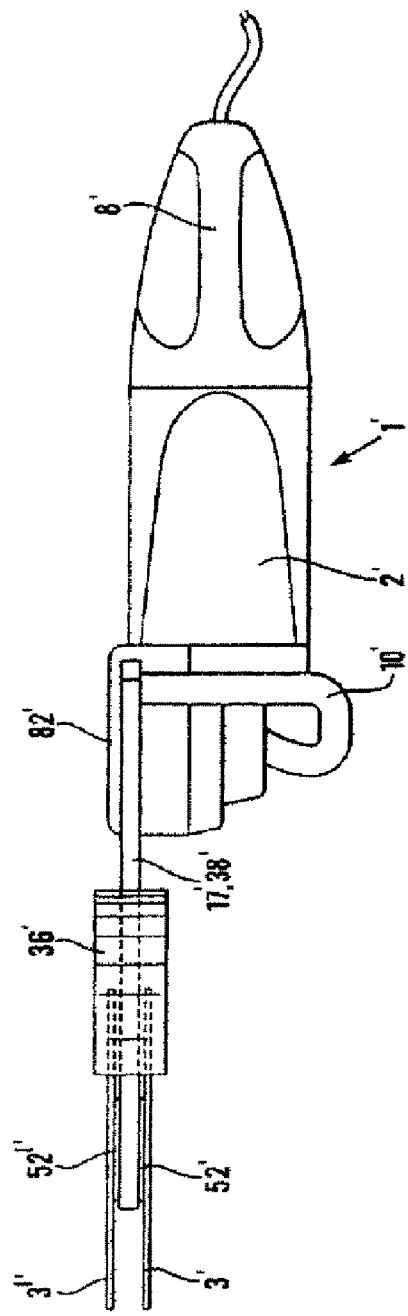

CUTTING OR SAWING MACHINE

CROSS-REFERENCE TO RELATED APPLICATIONS

The present application is a continuation patent application of U.S. patent application Ser. No. 11/626,361 filed 23 Jan. 2007 now U.S. Pat. No. 7,571,720 which is a continuation patent application of International Application No. PCT/SE2005/000421, filed 23 Mar. 2005, which was published in English pursuant to Article 21(2) of the Patent Cooperation Treaty. Said applications are expressly incorporated herein by reference in their entireties.

FIELD

The present invention relates to a cutting or sawing machine comprising a machine body, at least one disk shaped, rotatable tool, at least one rotatable driving member having an axis of rotation which is coaxial with the tool, an elongated tool carrier having the substantial shape of a flat bar having a front end and a rear end, two opposite broad sides and two opposite edge sides, and having a rear end which is connected to the machine body and a front end in which said at least one tool is rotatably mounted, and a power transmission for rotation of the tool via said driving member.

BACKGROUND

A cutting machine of the general nature is disclosed in U.S. Pat. No. 4,717,205 in the form of a machine comprising a tool carrier consisting of a hollow arm and a driving member consisting of a sprocket accommodated inside of the hollow arm, in the front end thereof. On each side of the sprocket there is a bearing, each arranged in a bearing hole in a broad side of the hollow arm. Outside of each bearing there is a rotational tool. Because of this conventional bearing arrangement there is a considerable distance between the two rotational tools. This increases the distance between the two cuts which is a distinct disadvantage. Another shortfall is that the machine is void of any kind of tool guard and nor is any solution of that safety issue suggested in the disclosure of the said US patent.

A machine is disclosed in EP-1,252,956-A1 in which the tool carrier consists of a solid bar of sufficient width for the provision of a desired bending resistance to the tool carrier and also for allowing the provision of a single bearing of desired width in the front end of the bar. The latter is an important technical achievement, making it possible to reduce the distance between the two rotational tools; i.e., the two cuts.

SUMMARY

According to a first variant of the machine, the tool carrier comprises at least two elongated side walls, a first elongated side wall on one broad side of the tool carrier, a second elongated side wall on the opposite broad side, said first and second side walls being essentially parallel with each other, and the front part of either one of the side walls or of a possible central elongated member between the first and second side walls is provided with a bearing hole intended to carry a bearing of sliding contact type or of rolling contact type, i.e. a rolling bearing, and the two side walls and the possible central member being connected to each other at a plurality of sites, and each side wall has a length adapted to essentially cover at least the gap between the machine body and the perimeter of its associated disc shaped tool, i.e. the tool located on the same side of the tool carrier, sp that from each broad side the side wall and the associated disc shaped tool together cover the power transmission to increase safety and reliability. A sealing may be provided in each of said second and third major holes, at least partly sealing a gap between each of the side walls of the tool carrier and the respective adjacent rotatable cutting tool, and the first improvement of the machine also includes a sealing element per se, which is provided for sealing at least partly said gaps.

A second variant of the invention relates to the blade guard system of a cutting or sawing machine of the type which comprises a machine body including a power source, a tool assembly including two disk shaped, rotational cutter blades, one on each side of an elongated tool carrier having a rear end which is connected to the machine body and a front end in which the cutter blades are rotationally mounted, and a power transmission for rotation of the cutter blades, the edge portions of which form the working parts of the cutter blades, said edge portions having first, inner sides which face one another, and second, outer sides which define planes which form the limits of the, in the axial directions, maximally projecting parts of the tool assembly as well as of at least a major part of the tool carrier, allowing the complete tool assembly and said at least major part of the tool carrier to be entered into a groove established in a working object after removal of material between the two parallel kerfs made by the two rotational cutter blades.

According to this variation, the machine is provided with at least one tool guard belonging to any of the following first and second types, wherein the first type blade guard is a blade guard which is mounted on the tool carrier, adjacent to the tool assembly and has a width, i.e. extension in the axial direction, which is smaller than the distance between said second, outer sides of the edge portions of the cutter blades and hence also smaller than the width of said groove, allowing the first type blade guard to be entered into said groove, and wherein the second type blade guard is a blade guard which is pivotally mounted to the tool carrier or the machine body via a hinge adjacent to the rear end of the tool carrier and has a width which is larger than said distance between said second, outer sides of the edge portions of the cutter blades, preventing the blade guard of said second blade guard type from entering said groove but allowing a tip portion of it to slide against the outer surface of the working object when the tool assembly has entered the working object to a certain depth, turning said second type blade guard rearwards in said hinge.

A third variant relates to a bearing unit which is intended to be applied in a machine which may be designed as described above, but which also may have other fields of use. The bearing unit includes a sliding contact or preferably a rolling-contact, i.e. a rolling bearing, and holder in the form of a circular ring; The term "rolling bearing" throughout this text means an anti-friction bearing composed of rolling elements interposed between an outer and an inner ring and includes ball bearings, roller bearings, and needle-roller bearings. According to the improvement, the holder ring has a first end surface in a first end of the ring, a second end surface in the opposite end, and an inner side which is cylindrical and extends between said first and second end surfaces, a flange in said first end extending radially outwards, the plane of a first annular surface of the flange coinciding with the plane of said first end surface, an outer side section of the holder ring extending between said flange and said second end surface, said side section being cylindrical and threaded, and wherein the rolling bearing is secured in the holder ring with the outer bearing ring pressed against said inner side of the holder ring.

A fourth variant relates to a screw and nut coupling, in which one of said coupling members has at least one protrusion on the side facing the other member, laterally displaced relative to the threaded part of the member, said protrusion extending in the axial direction towards the other member. Also this improvement is intended to be employed in the first place in the machine of the present type, but may optionally also have other fields of use. Other aspects and features of the cutting or sawing machine and its related improvements will be apparent from the following description of a preferred embodiment of the machine and from the appending dependent claims.

BRIEF DESCRIPTION OF THE DRAWINGS

In the following description of a preferred embodiment, reference will be made to the accompanying drawings, in which:

FIGS. 3, 3A, 4A, 4B, 5A and 5B show a number of main parts, which in combination form a tool carrier included in the cutter;

FIG. 3 is a side view of a central member including a flat plate inside the tool carrier and a bushing;

FIG. 3A shows a front portion of the central member, including said bushing, along the line 3A-3A of FIG. 3;

FIGS. 4A and 4B are side views, showing the outside of a front member and of a rear member, respectively, of a dish-shaped cover on the right hand side of the tool carrier;

FIGS. 5A and 5B show the inside of a front member and of a rear member, respectively, of a dish-shaped cover on the left hand side of the tool carrier;

FIGS. 6A and 6B show the members of FIGS. 4A and 4B in cross-sections along the lines 6A-6A and 6B-6B, respectively;

FIGS. 7A and 7B show the members of FIGS. 5A and 5B along the lines 7A-7A and 7B-7B, respectively;

FIG. 8 shows the front member of the left hand side cover of the tool carrier in a view along the line 8-8 in FIG. 5A;

FIG. 8A shows an encircled part of FIG. 8 at a larger scale;

FIG. 9 is a side elevation of a bracket;

FIG. 10 shows the bracket in a view along the line 10-10 in FIG. 9;

FIG. 11 shows the major part of the tool carrier from the right, two front blade guards and a rear blade guard, a tool assembly shown in FIGS. 1 and 2 being dismantled;

FIG. 13 is a side view of a bearing unit;

FIG. 14 shows the bearing unit in cross-section along the line 14-14 in FIG. 13;

FIG. 15 is a cross sectional view of a ball bearing assembly along the line 15-15 of FIG. 11;

FIG. 16 is a perspective view of a driving member in the form of one half of a split belt pulley;

FIG. 17 shows the driving member in an axial cross-section;

FIG. 17A shows an encircled detail A of FIG. 17 at a larger scale;

FIG. 18 is a side view and FIG. 19 is a cross sectional view of an integrated tool unit consisting of a tool and a driving member;

FIG. 22 shows, semi-schematically, a tool assembly, the belt pulley, the tool carrier, and a portion of a machine body in a vertical view, corresponding to a vertical plane of symmetry of the tool assembly;

FIG. 23 is a perspective view of a sealing element;

FIG. 24 is a side elevation of the sealing element; and

FIG. 25 is a sectional view the sealing element along the line 25-25 in FIG. 24.

FIG. 37 schematically shows a side view of a third machine embodiment in accordance with the invention; and FIG. 38 is a top view of the embodiment of FIG. 37.

DETAILED DESCRIPTION

Figure 1:
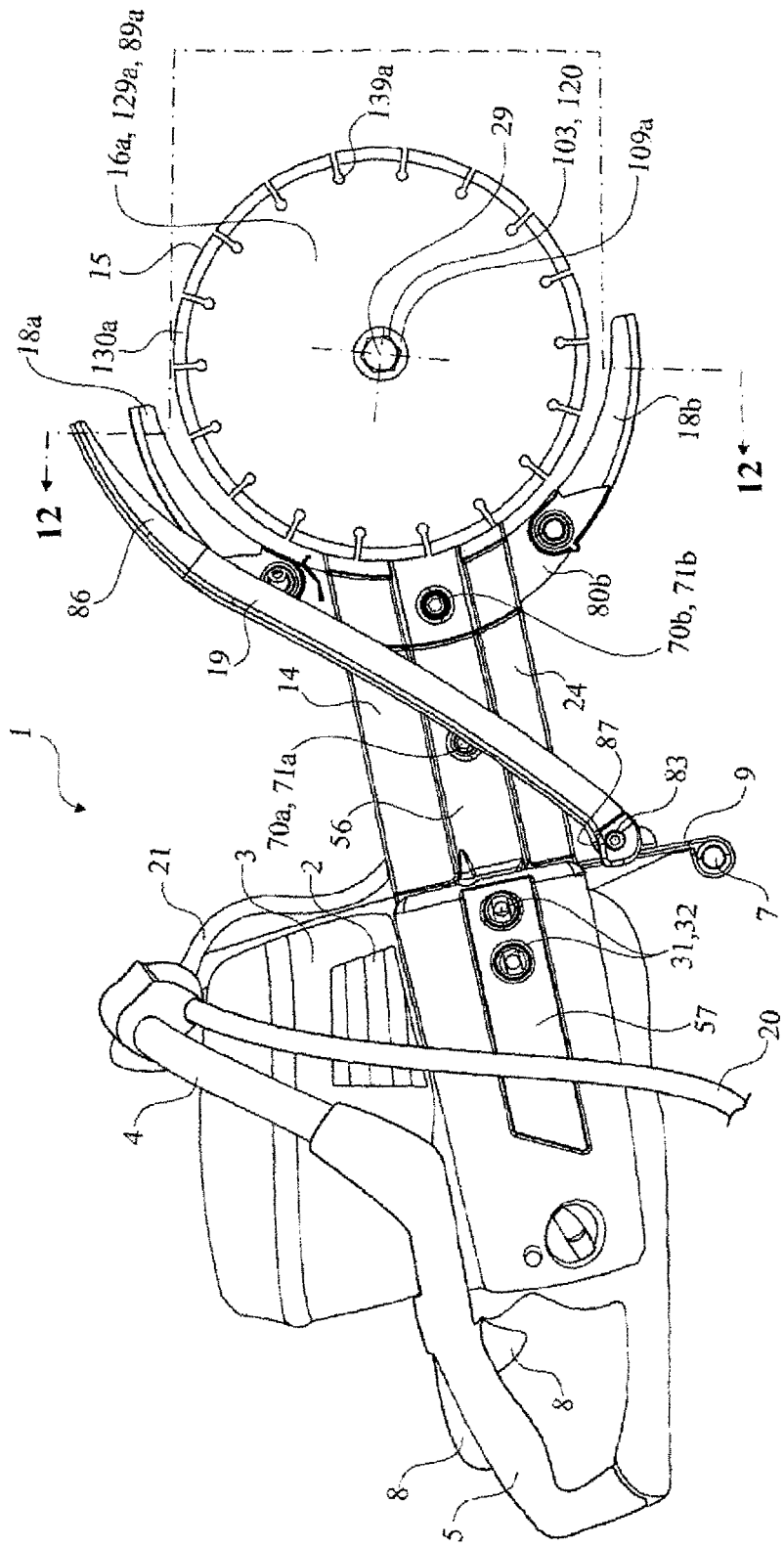
FIG. 1 is a perspective view from the right of a cutting or sawing machine (in the following referred to as cutter) according to a preferred embodiment of the invention.
Figure 2:
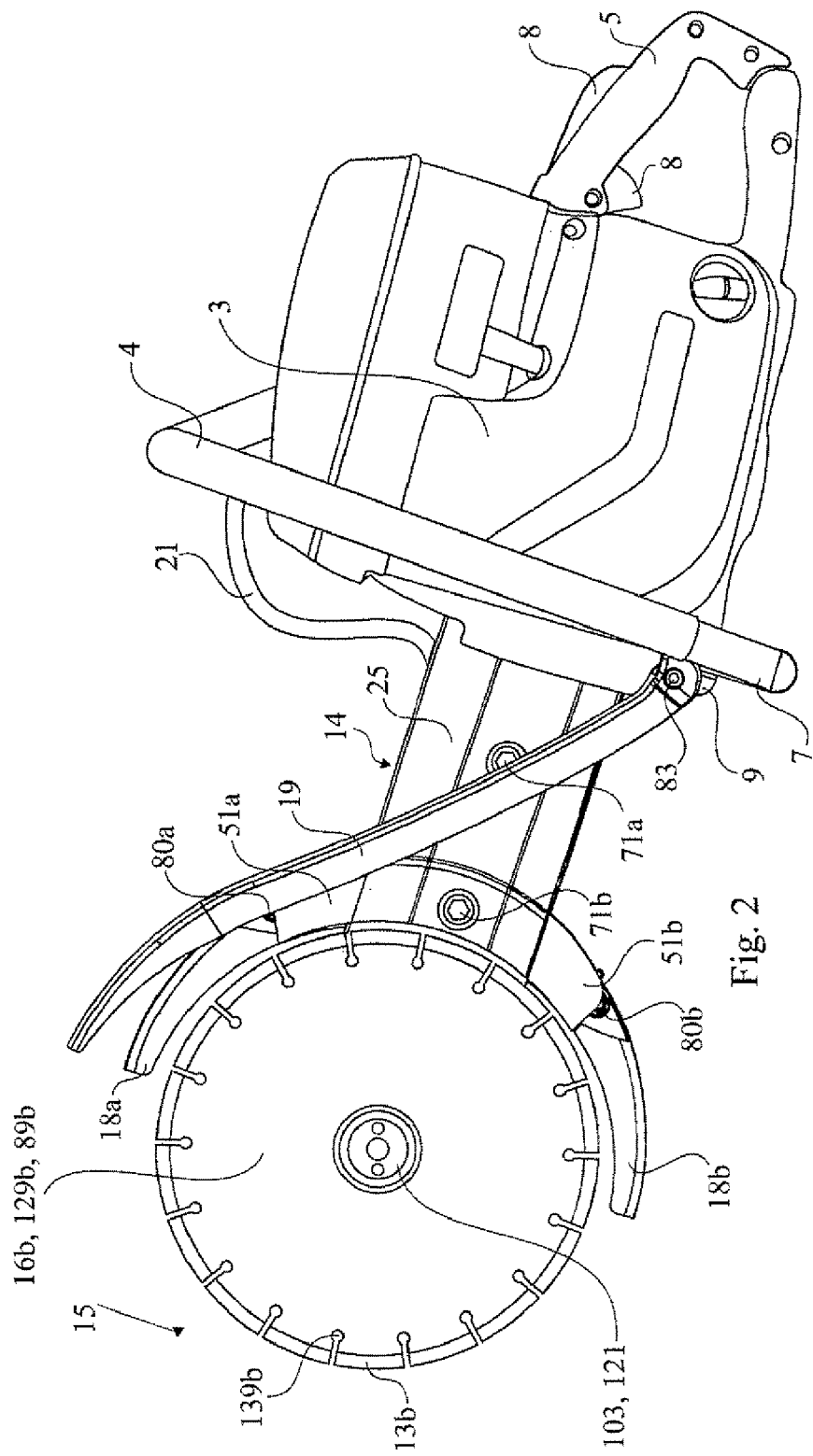
FIG. 2 is a perspective view of the cutter as viewed from the left.

With reference first to FIGS. 1 and 2, a cutter, which is a portable, hand held cutting or sawing machine, is generally designated 1. The power source of the cutter 1 is preferably an internal combustion engine 2 in a machine body 3, but also an electric, air or hydraulic motor could be used. An anti-vibrated handle system includes a front handle 4 and a rear handle 5 with controls 8. The front and rear handles are connected to one another on the right hand side of the machine. The front handle 4 extends over the machine body 3, proceeds down on the right hand side and further on by a bottom section. The bottom section serves as a support 7 under the front part of the machine body 3. The anti-vibrated handle system is completed by a vertical link 9, which connects the support 7 with the right hand parts of the system. Further, with reference to FIGS. 1 and 2, the cutter 1 has an elongated tool carrier 14 extending forwards from the machine body 3; a tool assembly 15 including two parallel, coaxial, first and second cutter blades 16a, 16b at a short distance from one another in the front end of the tool carrier 14, one on each side of the carrier; a pair of front blade guards pivotally connected to the tool carrier 14, including an upper blade guard 18a and a lower blade guard 18b; a rear blade guard 19 pivotally connected to said vertical link 9; and water supply hoses 20, 21. A centre 29 of rotation of the tool assembly 15 is common to all the rotary members of the assembly.

Figure 3A:
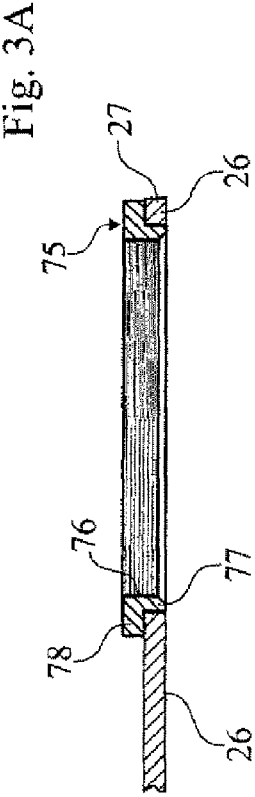
Figure 3:
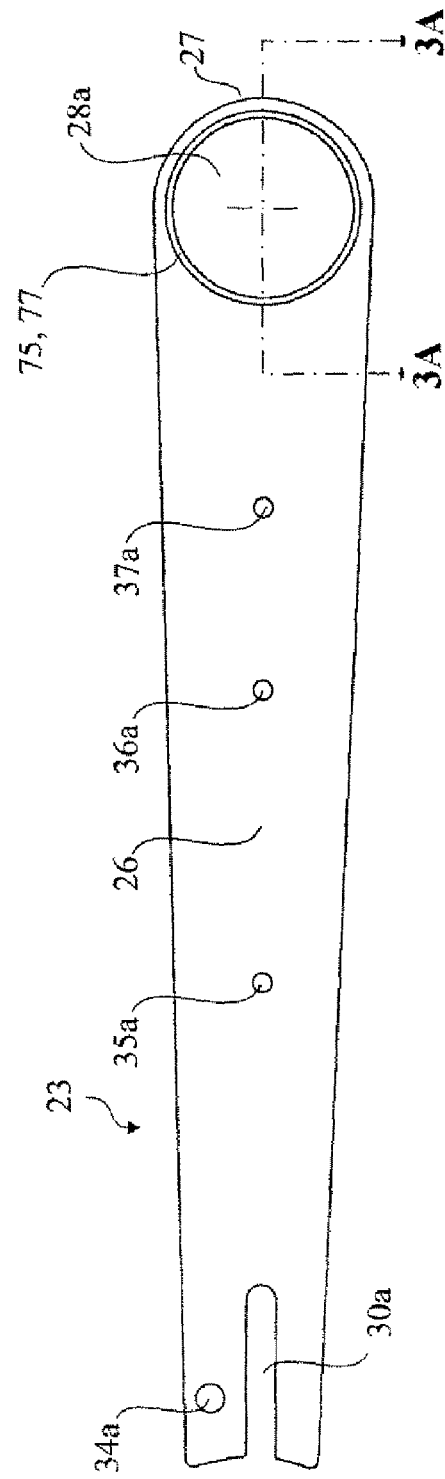
Figure 12:
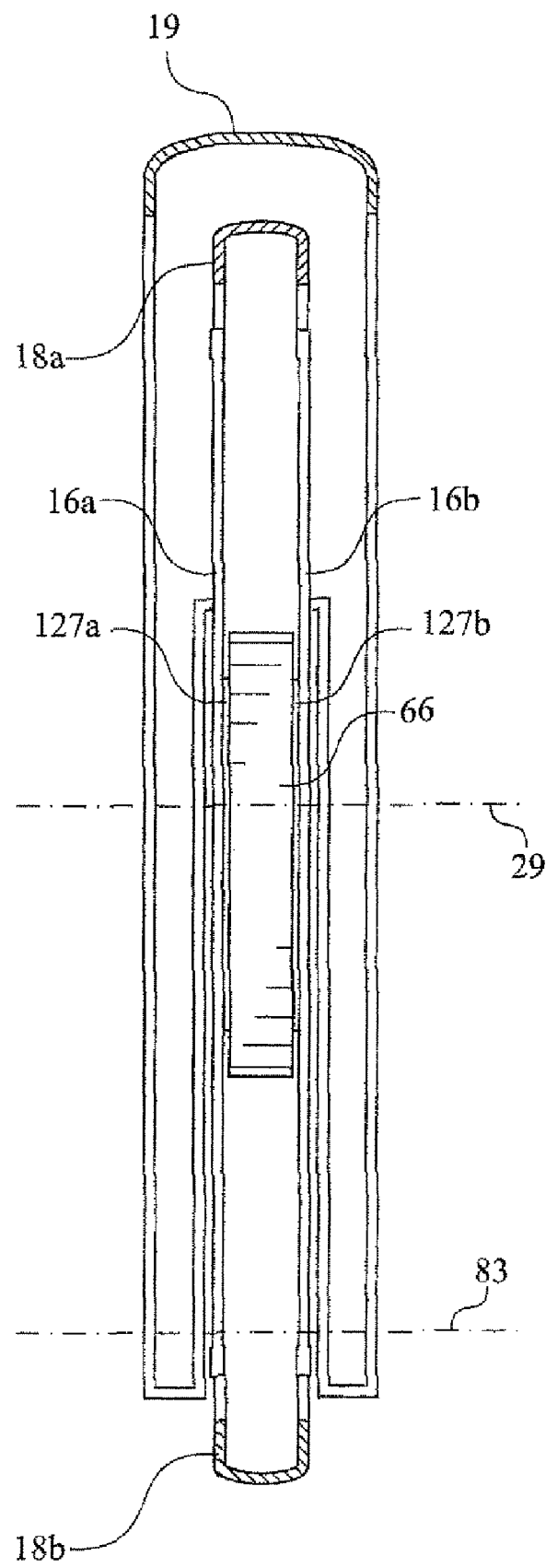
FIG. 12 shows the tool carrier, the tool assembly and the blade guards in a view along the line 12-12 of FIG. 1.

The tool carrier 14 essentially consists of a first dish-shaped, right hand side cover 24, FIG. 1, a second dish-shaped, left hand side cover 25, FIG. 2 (the covers 24 and 25 may also be referred to as panels); and a central, elongated plate 23, FIG. 3, which extends between and is secured to the side covers, in the following referred to as first and second dishes 24 and 25, respectively.

The plate 23 is preferably made of a hardenable, stainless steel grade, which normally is employed for springs. It has preferably a thickness of only 3 mm, which makes it comparatively light, and is hardened and tempered to provide a desired combination of strength and toughness. However, it could be manufactured from steel, aluminum or a composite material. Its width continuously increases in the direction from the rear end to the front end. In the front end, adjacent to the front tip 27 of the plate, there is provided a major, circular hole 28a. In the assembled tool carrier and tool assembly, the centre of the hole 28a coincides with the centre of rotation 29 of the cutter blades 16a, 16b. In the rear end of the plate 23, there is provided a slot 30a. Equal slots 30b, 30c are provided in the dishes 24, 25, establishing a joint slot 30 in the rear end of the tool carrier 14, FIG. 1, for securing the assembled tool carrier 14 to the machine body 3 in a manner known by se by means of bolts 31 and nuts 32 under a clutch cover 33 of the machine body, covering a centrifugal clutch and a driving wheel. Also a small through hole 34a is provided in the rear end of the plate 23. Further three holes 35a, 36a, and 37a are provided in the plate along a straight line extending between the slot 30a and the centre of the major hole 28a. The plate 23 is flat and is made from a blank through punching, including all the said holes 28, 34a-37a as well as the slot 30a. Punching is an inexpensive mode of manufacturing in contrast to machining, which is not employed in the manufacturing of the plate 23. Therefore, although the plate is made of stainless spring steel, it can be manufactured at a fairly low cost. With reference to FIG. 3A, an annular bushing 75 is provided in the hole 28a of the plate 23. The bushing 75 has an internal thread 76. The bushing 75 is L-shaped in cross section, one leg 77 of the L being the threaded part of the bushing, the other leg of the L forming a flange 78. The bushing 75 is press fit in the hole 28a, forming a permanent and integrated part of the central member 23 of the tool carrier 14. The outer, cylindrical surface of the first leg 77 abuts the cylindrical surface of the hole 28a, while the flange 78 abuts that side of the plate 23 which faces the second, left hand dish 25 of the tool carrier 14. The end of the leg 77 is level with the opposite side of the plate 23, facing the first dish 24 of the tool carrier 14. The axial length of the bushing 75 corresponds to twice the measure of the thickness of the plate 23.

The dishes 24 and 25 match one another, the first dish 24 fitting as a male part in the second dish 25 which is the female part of the tool carrier assembly. Each dish may very well consist of a single part, but, according to the embodiment, each of them consists of two members. Thus the first dish 24 consists of a front member 24a and a rear 24b. Correspondingly, the second dish 25 consists of front and rear members 25a and 25b, respectively. On the first dish 24, a male rim 40 consisting of rim sections 40a and 40b on the front and rear members 24a and 24b, respectively, extends, square to the plane of the dish, along one longitudinal side from the rear end thereof, around the rounded front of the dish and along the opposite longitudinal side to the rear end of that side. Correspondingly, a matching female rim 41, composed of rim sections 41a and 41b, is provided on the second dish 25, following the same pathway as the male rim 40 of the first dish 24. The width of the first dish 24, i.e. the distance D1 between the outer surfaces of the opposite parts of the rim 40, FIG. 4B, equals the distance D2 between the inner surfaces of the opposite parts of the rim 41, FIG. 5B, allowing the first dish 24 to be inserted into the second dish 25 with a snug fit between the rims 40 and 41, including a snug fit also in the region of the rounded front parts of the dishes, FIG. 21.

The first and second dishes 24 and 25 are provided with a major, circular hole 28b and 28c, respectively, in the front part of the front members 24a and 25a, respectively. The holes 28b and 28c have a larger diameter than the hole 28a in the front portion of the central plate 23. In the assembled tool carrier 14 and in the tool assembly 15, all the three holes 28a-28c are aligned and coaxial with the centre of rotation of the cutter blades 16a and 16b.

The front and rear members 24a and 24b of the first dish 24 are also provided with small holes 35b, 36b' and 36b", 37b, respectively. Correspondingly, the front and rear members 25a and 25b of the second dish 25 are provided with holes 35c, 36c' and 36c", 37c, respectively. The holes 35b and 35c, and the holes 37b and 37c in the first and second dishes 24 and 25, respectively, in combination with the holes 35a and 37a in the central plate 23, serve to attach the dishes 24 and 25 to the plate 23 by means of screws and nuts. The holes 36b' and 36b", and the holes 36c' and 36", in combination with screws and nuts 70b, 71b, FIGS. 1 and 2, serve to connect the first and second dish members 24a and 24b, and 25a and 25b, respectively, with one another, and also, in combination with the aligned hole 36a in the plate 23, to assist in attaching the dishes 24 and 25 to the central plate 23. The hole 36b" of front member 24a of the first dish 24 is provided in a tongue-shaped projection 43a, which is placed inside of a front section 44a of the rear member 24b, i.e. on top of said front section 44a with reference to FIG. 4B. A circular region surrounding the holes 36b' and 36b", respectively, have the shape of matching, shallow cups 45a and 46a, respectively, which facilitate the alignment of the holes. Also the hole 35b is located in the centre of a cup shaped indentation 47a of the rear dish member, while the hole 37b is located in a trough-like indentation 48a extending in a direction transverse to the longitudinal direction of the tool carrier. The front and rear members of the second dish 25 are correspondingly provided with equally designed indentations 45b, 46b, 47b and 48b.

In this connection, reference also shall be made to FIGS. 9 and 10, which show a crescent-shaped bracket 50 which is intended to be mounted to the first dish 24 on the right hand side of the tool carrier 14, FIG. 1. In combination with a pair of brackets 51a and 51b, which are secured through welding to the second dish 25 in a mode which will be explained more in detail in the following, the bracket 50 serves to hold the front blade guards 18a and 18b. As is shown in FIG. 4B and FIG. 6B, the front section 44a of the rear member 24b of the first dish 24 is depressed to form a depression 54 which is designed such that it can accommodate the central part of the crescent-shaped bracket 50. The bracket 50, in the centre thereof, also is provided with a hole 36d in the centre of a cup shaped depression 46d, matching the cup-shaped indentations 46a and 45a of the front and second members 24a and 24b of the assembled first dish 24.

The rearmost section of the rear member 24b of the first dish 24 is also depressed, the rearmost depression being designated 55, in order that said rearmost section shall be accommodated under the clutch cover 33 of the machine body 3. The first dish 24 also has a longitudinal, central depression 56 extending from the front edge of the clutch cover 33, forming an extension of a depression 57 in said clutch cover 33, all the way to the front end of the dish. The depression 56 increases the rigidity of the first dish 24 and it also has aesthetic merits, being an extension of the depression 57 in the clutch cover 33. In the depression 55, there is also a central, deeper depression 58a on both sides and in front of a slot 30b and a hole 34b corresponding to the slot 30a and the hole 34a, respectively, in the central plate 23. Two small holes 59a are symmetrically provided in the first dish 24 in the region of the central depression 56, adjacent to the second major hole 28b, and equal holes 59b are provided in the second dish 25.

Also the rear member 25b of the second dish 25 is provided with a rear slot 30c, a hole 34c and a depression 58b corresponding to the slot 30b, hole 34b and depression 58a of the rear member 24b of the first dish 24.

In the front and rear members of the second dish 25, metal strip sections 61a and 61b are provided at a short distance from the upper part of the rim 41, which in combination with the dishes 24 and 25 form a sheltered passageway 62 for the water hose 21. The passageway 62 has an inlet 63 adjacent to the machine body 3 and an outlet 64 adjacent to the front holes.

The dishes/panels 24 and 25 are made of thin steel sheet, e.g. of zink-plated steel sheet, with a thickness of about 1 mm, which makes it possible to manufacture the dish members through punching and pressing operations which is convenient from an economical point of view. Also aluminum or other light metals or plastic materials may be considered. The dishes 24, 25 in combination with the central plate 23 provide a desired strength to the tool carrier 14. They also serve to shelter the power transmission, which includes a driving V-belt, and the water hose inside the tool carrier. However, they do not afford a sufficient wear resistance to the front portion of the tool carrier between the blades 16a and 16b, when the cutter 1 is operating in concrete or other hard working material. Therefore a reinforcing strip 66 of wear resistant steel is provided outside the rim-section 41 a of the front member of the second dish 25. The wear resistant strip 66 is attached to the rim section 41a through welding. The brackets 51a, 51b in turn are attached to said wear resistant strip 66 through welding, FIG. 8A.

When assembling the tool carrier 14, the front section 44b is placed on the inner surface of the matching rear section 44b' of the front member 25a of the second dish 25, such that the holes 36c' and 36c" will align. A screw 70b is inserted through the aligned holes and a screw 70a, 70c is also inserted in each of the holes 35c and 37c. The screw heads are recessed in the cup-shaped depressions surrounding the holes. The plate 26 then is placed on the inside of the assembled second dish 25 so that the screws 70a-70c will extend also through the holes 35a-37a of the plate 23, the flange 78 of the permanently secured bushing 75 facing said second dish 25.

Above has been described one embodiment of the tool carrier, but there are several others. An important feature of this invention is that either one of the side walls or of a possible central elongated member is provided with a bearing hole. In the above described embodiment the bearing hole is provided in the central elongated member 23. By using a single bearing or bearing unit provided only in one of the members the width of the distance between the tools can be reduced, and thereby the width of the cut. The power transmission includes an endless drive chain or preferably a drive belt, which is movable within a plane and the bearing or bearing unit is located essentially within said plane. However, the tool carrier can also be arranged without a central member 23. Instead it then uses two side walls, a first and a second side wall. And the bearing hole is arranged in one of those. Preferably the second side wall 25 is arranged as a strong side wall having the bearing hole carrying a bearing or bearing unit. This side wall preferably has edge sides outside of the drive belt, preferably on both edges to protect the belt. Assuming that the second side wall 25 and the central member 23 of the first embodiment would have been welded together this would instead create a strong second side wall to be covered with a lid-like first side wall 24. However, this strong side wall could during part of its length even have a first side wall 24 of the opposite broad side of the tool carrier 25. But this does not apply to both ends of the tool carrier as it must be possible to remove the drive belt for changing it. This creates however a closed section during a part of the length of the tool carrier, thereby increasing its stiffness towards bending or twisting. The material of such a strong side wall having the bearing hole is either aluminum, iron or steel and preferably formed by casting, e.g. die-casting, or is a composite material. The other side wall that does not carry the bearing hole is preferably made like a lid and preferably covers the first broad side of the tool carrier at least partly. This always refers to the front part of the tool carrier to make it possible to exchange the drive belt. Such a side wall is preferably made of steel, aluminum or a composite material.

Prior to completing the assembly of the tool carrier 14, a V-belt 72 is provisionally placed such that it will embrace the plate 23 around and along it. The V-belt 72 is laid around a driving pulley 73, and the partly assembled tool carrier is attached to the machine body 3 such that the bolts 31 will be accommodated in the slots 30a, 30c. Now the rear member 24b of the first dish 24 can be added, such that the rear slot 30b will be aligned with the mentioned slots 30c and 30a, said slots 30a-30c in combination defining the slot 30. The screw 70a provided in the holes 35c and 35a also extends through the hole 35b of said member 24b. Said rear member 24b of the first dish 24 now may be secured by means of said screw 70a running through the holes 35c, 35a and 35b and a tightening nut 71a, which will be recessed in the cup shaped indentation 47a of the rear dish member 24b, FIG. 22. The clutch cover 33 then is attached to the machine body 3 and is secured by means of the nuts 32 on the bolts 31. Finally, also the front member 24a of the first dish member 24 is mounted to complete the tool carrier 14 wherein the tongue-shaped projection 43a is placed in the region of the inside of the front section 44a of the rear member 23b. The front member 24a is secured by means of the previously mentioned screws and nuts 70b, 71b and the assembly of the tool carrier 14 is completed by means of a screw 70c running through the holes 37c, 37a, 37b, and a nut 71c, FIG. 22. A spring clip (not shown) may be provided under the screw head of the screw 70c and under the nut 71c, respectively, accommodated in the trough-like indentations 48a, 48b in order to reduce any possible deflection of the cutter blades during operation.

When tightening the screws 70a-b and nuts 71a-b, the material of the dishes 24 and 25 in the region of the indentations 48a, 45a, 47a and 48b, 45b and 47b, respectively, will be pressed tightly against the central plate 23, wherein a composite bar structure is established, which increases the bend strength of the tool carrier 14 considerably.

The composite bar structure, which is possible to dismantle through unscrewing the screws, may also be referred to as a framework or girder structure of small size. For the different versions having only two side walls the assembly is made in a corresponding way to the above described, bearing in mind that the strong side wall exchanges the central member.

The upper front blade guard 18a is pivotally connected between on one hand the upper portion 50a of the crescent-shaped bracket 50 which is fastened to the first dish 24 and on the other hand to the upper bracket 51a which is welded to the second dish 25. Correspondingly, the lower front blade guard 18b is pivotally mounted between the bracket portion 50b and bracket 51b. The centres of turning are designated 80a and 80b, respectively. The blade guards 18a, 18b, which are preferably made of a tough and strong plastic material, are designed as end portions of a crescent, which has a shape corresponding to the shape of the bracket 50. Further, the upper and lower blade guards 18a and 18b are U-shaped in cross section, the interior of the U facing the cutter blades 16a and 16b. The distance D3 between the outer surfaces of the legs 81a, 81b of the U does not exceed the distance D4, FIG. 22, between those parts of the blades 16a and 16b, which project maximally in the lateral directions. This means that the distance D3 is smaller, but only slightly smaller than the width of the groove, which will be established by means of the cutter 1 in the working object. The front blade guards 18a and 18b can be folded back about their axes of turning 80a and 80b, respectively, such as is indicated by ghost lines in FIG. 11 in order that the front blade guards 18a, 18b, when they are inserted into the groove, which has been established in the object that is being worked, will not prevent the rotating cutter blades from working further into the working object, in directions square to the axis of rotation and to the longitudinal direction of the tool carrier 14.

The rear blade guard 19 is also U-shaped in cross section and is pivotably connected to the vertical link 9 under the tool carrier 14. The tip portion 86 is made of resilient rubber, while the main part consists of a strong, rigid and tough plastic material. The centre of turning of the blade guard 19 is designated 83. All the way from the bottom end of the blade guard 19 up to more than half the length of the blade guard 19 there is provided a central slot 84. The blade guard 19 in other words is designed as a fork having one leg on each side of said slot 84, a first one 85a to the right of the tool carrier 14 and a second one 85b to the left of the tool carrier. The width of blade guard 19 exceeds the width of the front handle guards 18a and 18b and it is also larger than the width of the cleared groove which is established in the object that is being worked by the cutter 1. This means that the resilient nose 86 of the rear blade guard 19 will contact the wall of the object that is being worked, when the blades 16a, 16b has penetrated the working object to a certain depth, whereupon the nose 86 will slide against the wall as the tools successively proceed deeper into the object, folding the rear blade guard 19 upwards, pivoting it about its axis of turning 83. A helical spring 87 (not shown) will return the blade guard 19 to its original position shown in the drawings, when the cutter is withdrawn from the object that has been worked. There could also be a second rear blade guard and this could preferably be pivotally connected to the first rear blade guard, or it could be pivotally connected to the tool carrier or the machine body. By using two rear blade guards even more protection is attained and they could be used also without using any front blade guards.

FIG. 13 is a side view of a bearing unit 90 consisting of a single-row rolling bearing 91 and an annular bearing holder 92. According to the embodiment, the rolling bearing 91 is a ball bearing, which has an inner ball bearing ring 93, an outer ball bearing ring 94 and an annular shield 95 between the ball bearing rings. The bearing holder 92 has an inner cylindrical surface 96, the diameter of which corresponds with the outer diameter of the outer ball bearing ring 94. The outer ring 94, and hence the entire ball bearing 91, is permanently secured through press fit to said cylindrical surface 96, FIG. 14, of the bearing holder 92, such that the bearing 91 and its bearing holder forms a permanent unit. The axial lengths of the ball bearing 91 and its holder 92 are approximately equal.

As viewed in FIG. 14, the bearing holder 92 is L-shaped in cross section. The vertical column of the L is pressed with its cylindrical surface 96 against the cylindrical surface of the outer ring 94 of the ball bearing 91 as mentioned in the foregoing, while the horizontal part of the L forms a flange 97 pointing radially outwards. The exterior of the vertical part of the L is threaded. The threads are designated 98, the axial length, of which corresponds to the axial length of the bushing 75, FIG. 3A. The threads 76 of said bushing 75 match the threads 98 of the bearing holder 92. The bushing 75 and the bearing holder 92 in other words form threaded female and male members, respectively, or a nut and a screw of a nut and screw coupling which is applied for mounting the bearing unit 90, and hence the ball bearing 91, in the front hole 28a of the plate 26, clamping the plate 26 between the flange 78 of the bushing 75 and the flange 97 of the bearing holder 92. The flange 97 is provided with a great number of recesses 99 along its circumference adapted to an appropriate tool for screwing the bearing unit 90 into the bushing 75, for mounting the bearing unit 90 a new, fresh ball bearing, and/or for dismantling the bearing unit 90 if the bearing 91 is worn out and has to be replaced. The bearing holder 92 is accessible through the hole 28b in the front member 24a of the right hand, first dish 24 of the tool carrier 14, when the tool assembly 15 has been removed, FIG. 11.

FIG. 15 shows the ball bearing assembly 100 assembled. The assembly is easily made by screwing the ball bearing unit 90, FIG. 13 and FIG. 14, into the bushing 75, which is secured in the major hole 28a of the central plate 26 and forms an integrated part of the central member 23, FIG. 3 and FIG. 3A.

In the tool carrier 14, the first and second dishes 24, 25 form a casing, which forms a shelter for the driving V-belt 72 as well as for the water hose 21, which extends along the upper wall of the casing, above the V-belt.

In a manner known per se, the tool assembly 15 includes the first and second cutter blades 16a, 16b and a split belt pulley 101, consisting of the first and second driving members 102a and 102b, referred to as driving wheel halves in this context. The driving wheel halves are clamped together by means of a screw- and nut coupling 103 to establish said belt pulley 101. More specifically, according to the preferred embodiment, the tool assembly 15 consists of a first and a second tool unit, 104a and 104b, respectively, and said coupling 103. Each tool unit, such as the second tool unit 104b, FIG. 18 and FIG. 19, consists of a cutter blade 16a and a driving wheel half 102b.

The driving wheel halves 102a, 102b are equally designed according to principles disclosed in said EP-1,252,956-A1, the disclosure of which is found herein below. Thus, with reference to FIG. 16 and FIG. 17, the driving wheel half 102a has, on a first side 105a thereof, an annular surface 111a which is flat in order to be able to contact a flat first side 88a of a first cutter blade 16a and to be permanently (according to the embodiment) secured said cutter blade in order to form said first tool unit 104a. The flat annular surface 111a extends from the periphery of the driving wheel half to an annular projection 108a, which is designed such that it can extend into and fit in a central hole of the cutter blade 16a. Radially inside of the annular projection 108a there is circular, central recess 109a, which has a depth which corresponds to more than half of the maximal thickness of the driving wheel half. On the opposite, second side of the driving wheel half, the peripheral portion 110a has an annular, beveled surface 112a. Radially inside of the peripheral, chamfered portion 110a, on said second side 106a, there is a major, annular recess 113a, which extends in the radial direction from said peripheral portion 110a to a central portion 114a of the driving wheel half. Adjacent to said central portion 114a, there is provided an annular shelf 115a, forming a slight elevation of the bottom of the annular recess 113a, FIG. 16A. The width of the shelf equals, or is slightly smaller than the width (radial extension) of the inner ball bearing ring 93. The end surface 119a of the central portion 114a on said second side 106a of the driving wheel half 102a is completely flat and is square to the centre axis of the driving wheel half. The thickness of the end wall 107a of the central portion 114a is quite small; only about 2.5 mm according to the embodiment, corresponding to less than half of the maximal axial extension of the driving wheel half and also less than the depth of the central recess 109a, which affords the end wall 107a a certain degree of flexibility. A central clearance hole for a clamping screw 120 is designated 116a. Two diametrically opposed coupling holes 117a also extend, at a distance from the central hole 116a, through the central portion 114a. The outer surface 118a of the central portion is circular-cylindrical. The radius of the cylindrical surface 118a equals, or is slightly smaller than the inner radius of the inner ball bearing ring 93. The axial distance D5 between the shelf 115a and the plane of the flat end surface 119a of the central portion 114a is slightly, although in this connection significantly, smaller than half of the axial thickness of the inner ball bearing ring 93.

Figure 22A:
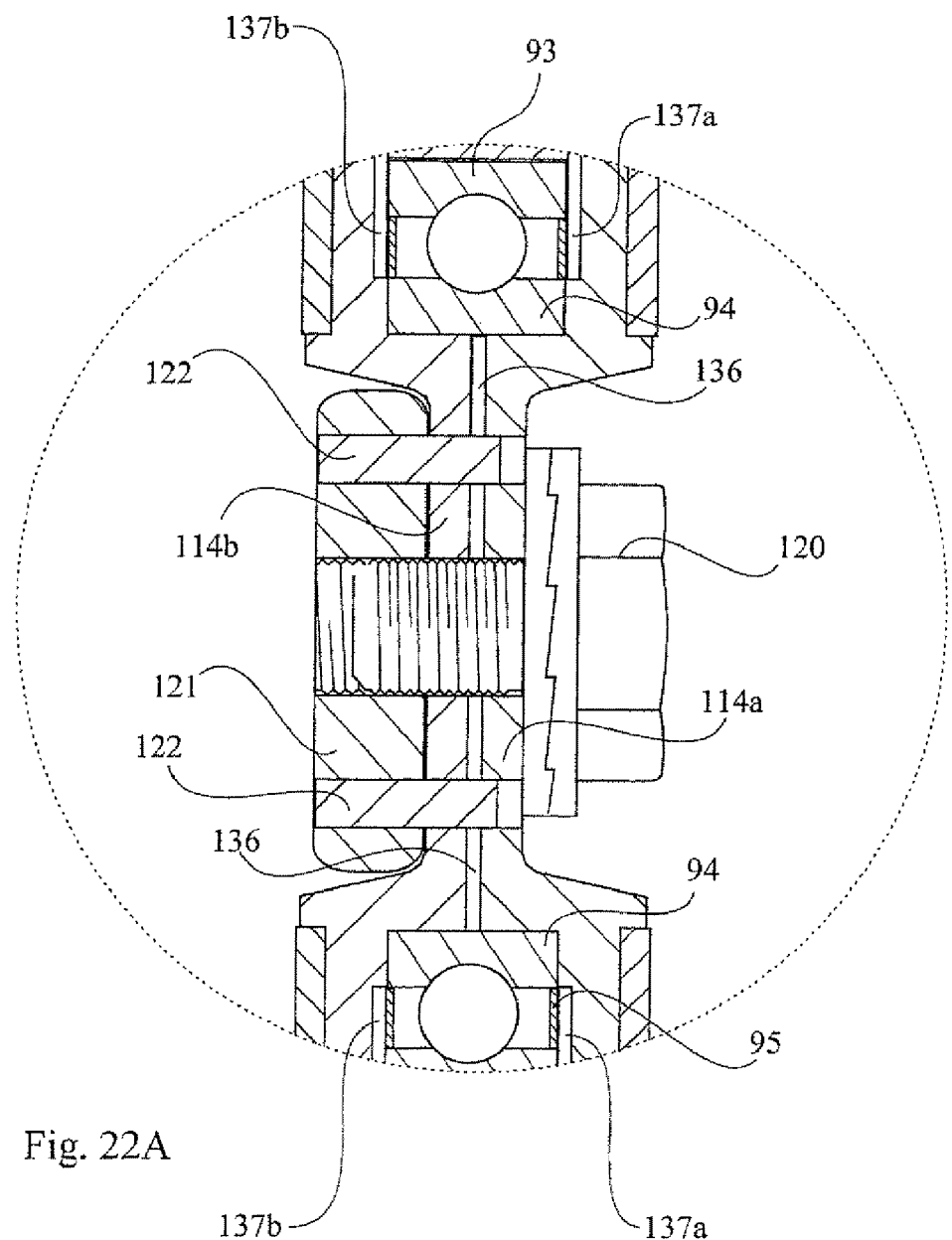
FIG. 22A shows an encircled detail A of FIG. 22 in a different rotational position and at a larger scale.
Figure 22B:
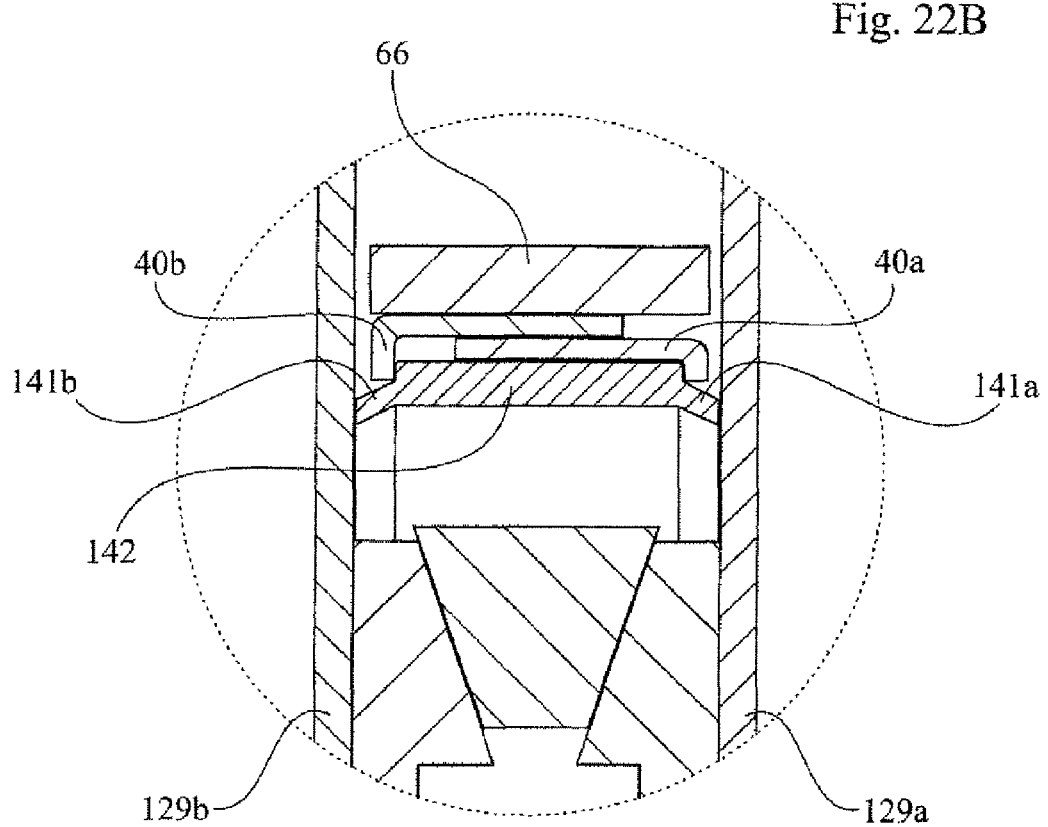
FIG. 22B shows an encircled detail B of FIG. 22 at a larger scale.

The outer radius of each of the driving wheel halves 102a, 102b, the outer, cylindrical surfaces being designated 127a and 127b, respectively, is smaller than the radius of each of the major holes 28b, 28c that is provided in the front portion of the first and second dish 24, 25, respectively. This means that the driving wheel halves of the assembled tool assembly 15 can be accommodated in said holes 28b, 28c, as is shown in FIG. 22, which will be discussed more in the following. The play 128a and the play 128b (the width of the annular gaps) between the edge of the respective hole 28b, 28c and the peripheral cylindrical surfaces 127a and 127b of the driving wheel halves 102a and 102b, respectfully, which are accommodated in said holes, amounts to 1-10 mm, preferably to 2-5 mm, suitably to not more than 4 mm. A play of that order is sufficient for preventing direct contact between the rotating wheel halves. At the same time the inflow of saw cuttings, dirt and/or liquid through the gaps 128a and 128b from the saw kerfs/groove where the cutter blades are operating, may be maintained at a low level. However, in order to prevent inflow of such undesired products more efficiently, and particularly to hinder water or other liquid from entering the region of the driving wheel consisting of the two driving wheel halves, a sealing element 140 may be provided in the front part of the tool carrier, including a sealing sleeve 141a,b in each of said gaps 128a, 128b. The sealing element 140 and its functioning will be explained more in detail in the following with reference to FIGS. 22B-25. As far as details of the second tool unit 104b and of the second driving wheel half 102b are concerned, the same reference numerals are used in this text and in the drawings as for corresponding details of the first tool unit 104a and of the first driving wheel half 102a but with the replacement of the "a" by a "b".

The cutter blades 16a, 16b are conventional diamond-tipped discs, although also other cutting tools may be considered, such as abrasive discs. With reference to FIGS. 18, 19 and 22, each cutter blade conventionally consists of a flat disc 129a, 129b of steel, on which elements 130a, 130b, which contain industrial diamonds held together by a bonding agent, in the following referred to as diamond elements, are tipped all around the periphery of the disc. The flat annular surface IIia of the first driving wheel half 102a is permanently secured through welding to the flat first side 88a of the first cutter blade disc 129a to form the first tool unit 104a. Correspondingly, the second tool unit 104b is formed of the second cutter blade 16b and the second driving wheel half 102b. The edge portions/diamond elements 130a, 130b form the working parts of the tool units and are thicker than the rest of the cutter blades. The latter implies that the side of the diamond elements 130a, 130b which forms part of the second side 89a and 89b of each cutter blade 16a, 16b, in a manner known per se, define a plane which forms a limit of the, in the axial direction, maximally projecting part of the tool assembly 15.

Figure 20:
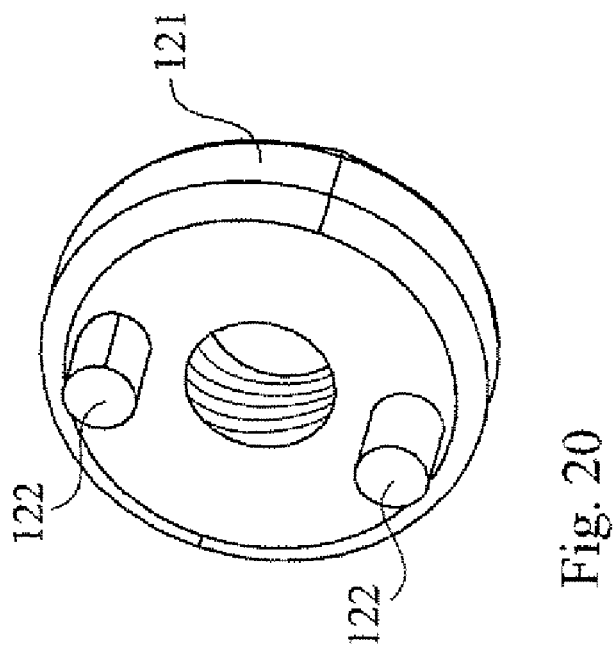

With reference to FIG. 20, a clamping nut 121 is provided, on one side of the nut, with two axially protruding fixing pins 122, one on each side of the threaded hole in the nut. The fixing pins 122 are cylindrical and have a diameter, and are provided at a distance from one another, matching the size of and distance between the coupling holes 117a and 117b of the central portion 114a and 114b, respectively of the driving wheel halves 102a, 102b. The length of the pins 122 corresponds to the total length of the pairwise aligned coupling holes 117a and 117b, FIG. 22.

Figure 21:
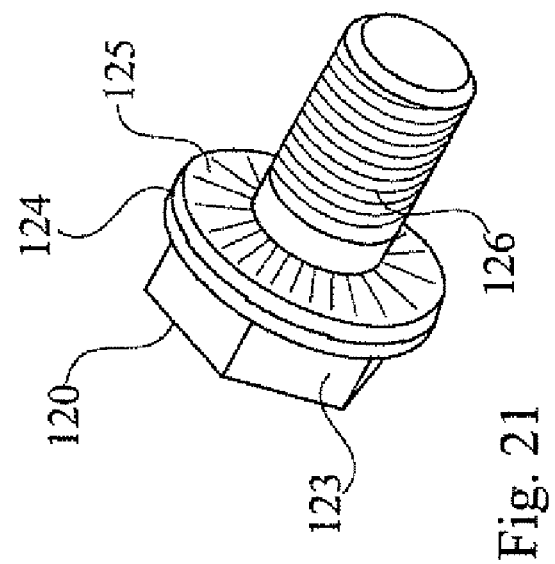
FIG. 20 and FIG. 21 are perspective views of a nut and of a screw and a washer, respectively, for assembling the drive members to form a belt pulley with the integrated bearing assembly in the front portion of the central plate of the tool carrier.

A coupling screw 120, FIG. 21, that matches the clamping nut 121, is a conventional screw, which is completed with a double lock washer 124 of the type known under the trade name NORDLOCK, in order to prevent unintentional unscrewing because of vibrations during operation of the machine 1. In the tool assembly 15, the diamond elements 130a,b account for by far the major part of the total costs. Therefore, when the diamond elements 130a,b are worn out, the rest of the tool units 104a, 104b is of little value. Therefore the entire tool units 104a, 104b are to be regarded as articles of consumption. Likewise, the ball bearing unit 90, which consists of the ball bearing 91 and the holder 92, is an article of consumption which shall be possible to be replaced readily, although not as frequently as the tool units. According to an aspect of the invention, all parts of the machine which have some importance in this connection are designed in a mode which allows easy dismantling and replacement of any articles of consumption. The integration of the cutter blades and the driving wheel halves, as well as the novel features of the driving wheel halves in combination with the novel coupling, including the novel clamping nut and clamping screw, for example, are features which in combination contribute to an easy dismantling and replacement of the worn out cutter blades. At the same time, the tool carrier is designed such that it i.e. provides a good protection of the power transmission, including the drive belt 72, as well as of the critical parts of the water supply hose 21 and of the ball bearing 91, which promotes a prolonged service life of those parts.

Now, with reference first to FIG. 11, it is understood that dismantling of a worn out ball bearing 91 and replacing it by a fresh one, is readily performed in the machine of the invention. The ball bearing unit 90, consisting of the ball bearing 91 and its surrounding holder 92 is visible and accessible through the major hole 28b in the first dish/side cover 24. The hole 28b is considerably larger not only than the major hole 28a in the central plate 26 but also so much larger than the ball bearing holder 92 that engagement means of an appropriate tool, e.g. the pins of a conventional pin spanner, can be entered through the hole 28b into engagement with two of the recesses 99 of the ball bearing holder. The ball bearing unit 90 containing the worn out ball bearing 91 in the holder 92 now is unscrewed by means of the spanner and is replaced by a new ball bearing unit 90 of the same type, containing an identical but fresh ball bearing 91. The new ball bearing unit 90 is screwed into engagement with the bushing 75, initially by hand and then by means of the same spanner or other tool that was used for unscrewing the ball bearing unit. Since dismantling of worn out cutter blades is more frequent than exchange of ball bearings, exchange of ball bearings is conveniently carried out in connection with dismantling and exchange of cutter blades.

Now reference is made to FIG. 22 so as to describe the machine according to the embodiment of the invention including also the tool assembly as well as other components according to various aspects of the invention. In the drawing, some details are shown more schematically, such as the first and second side covers/dishes 24, 25. The left, bottom part of the drawing shows how the rear parts of the dishes 24, 25, each one shown consisting of a single element, and the rear part of the central plate 26 of the of tool carrier 14, are clamped between the machine body 3 and the clutch cover 33 by means of the bolts 31 and nuts 32, keeping the assembled tool carrier 14 in a firm grip.

The endless V-belt 72 extends around and between the drive pulley 73 and the split belt pulley 101. The drive pulley is powered in a conventional way by the internal combustion engine 2 via an axle shaft and a clutch coupling. The V-belt 72 is tensioned in any convenient way, e.g. by means of a conventional belt tensioner, including a schematically shown tension screw 133 and a pawl, which extends into the aligned holes 34a-c in the clamped part of the tool carrier 14. By means of the screw 133 and the pawl, which can be displaced to and fro, displacing also the entire tool carrier 14, the V-belt 72 can be tensioned or the belt tension be released as desired, when the clamping pressure exerted by the screws 31 and nuts 32 is eased.

In the belt pulley 101, which also may be referred to as a driving wheel, the V-belt 72 is pressed against the beveled surfaces 112a and 112b of the driving wheel halves 102a, 102b, which face one another, forming between them a V-groove, 134. The shape of the V-groove 134 is adapted to the design of the V-belt 72, and the contact pressure is adjusted by means of the belt tensioner.

The cylindrical, peripheral surfaces 127a and 127b of the belt pulley 101/assembled driving wheel halves 102a, 102b extend from the planes of contact with the cutter blade discs 129a and 129b, which are outside of the side covers/discs 24 and 25, through the major holes 28b and 28c, respectively, to the V-groove 134, which is located inside of the covers/discs 24 and 25. The cylindrical, peripheral surfaces 127a and 127b in other words form a transition passing the holes 28a and 28b between the V-groove 134 inside the sheltering tool carrier 14 and the cutter blades 16a and 16b outside of the tool carrier 14. As mentioned in the foregoing, the play 128a and the play 128b between the driving wheel halves 102a, 102b, represented by their cylindrical surfaces 127a and 127b, respectively, and the edges of the holes 28b and 28c is only a few mm, which is important because any inflow of dust or other impurities into the tool carrier thence can be kept at a low level and/or facilitates the provision of efficient sealings, as will be described in the following.

Also the width of the gaps 135a and 135b between the sides of the tool carrier 14 and the cutter blades 16a and 16b are small; the order of about 1 mm. This is made possible through the provision of the ball bearing assembly 100 inside of the tool carrier and inside of the belt pulley 101, rather than outside of the tool carrier, between the tool carrier and the pulley as suggested by the prior art disclosed in said U.S. Pat. No. 4,717,205. For this achievement, it is also important that the axial length of each of the cylindrical surfaces 127a and 127b is short, i.e. the axial distance between the V-groove 134 and each of the steel discs 129a and 129b, respectively, is short, e.g. about 2 mm, which promotes the distance between the cutter blades to be short. This in turn means that also the distance between the two kerfs established by the cutter blades in the working object will be correspondingly small, which facilitates the removal of the material between the kerfs for the establishment of the desired groove in the working object, into which groove the tool assembly as well as the tool carrier can be further advanced.

In the belt pulley 101/tool assembly 15, the driving wheel halves 102a, 102b/tool units 104a/104b are clamped towards but not completely against one another by means of the screw and nut coupling 103. A small gap 136 will remain between the flat end surface 119a of the central portion 114a of the driving wheel half 102a and the corresponding end surface 119b of the driving wheel half 102b, even though the clamping screw 120 is tightened up such that the end walls 107a, 107b of the central portions 114a, 114b are slightly deflected. The reason is that the inner ball bearing ring 93 is clamped between the shelf 115a of driving wheel half 102a and the corresponding shelf 115b of driving wheel half 102b and because the distance D5 is smaller than half the axial width of the ball bearing 91.

Starting from the assembly shown in FIG. 11, the assembly of the tool assembly 15 as shown in the above discussed FIG. 22 now shall be described. The bearing assembly 100 is already mounted on the central plate 26 around its major hole 28a as has been described in the foregoing. The V-belt 72 is untensioned and is hanging loose in the tool carrier 14. A small part of it can be seen through the hole 28b, FIG. 11. Now the tool units 104a and 104b shall be mounted, which is readily carried out in the following way. To start with, the clamping nut 121 is assembled with one of the identically designed tool units, more specifically with the second tool unit 104b on the first side 105b of driving wheel half 102b. The fixing pins 122 are inserted into the coupling holes 117b in the central portion 114b of the driving wheel half 102b and the nut body 138 is pushed into the recess 109b to contact the end wall 107b in the bottom of the recess 109b. The entire nut body 138 is accommodated in the recess 109b, i.e. no part protrudes beyond the annular projection 108b. Now, the assembly consisting of the tool unit 102b and the clamping nut 121 is brought to its position shown in FIG. 22, wherein the central portion 114b is moved into the ball bearing 91, such that the shelf 115b will contact the inner ball bearing ring 93 at the same time as the peripheral driving wheel surface 127b adopts its position right in the hole 28c in dish 25. The V-belt 72, which is hanging loose around the ball bearing assembly 100, may be pushed aside by the beveled surface 112b, approaching its final position in the front portion of the tool carrier 14.

Next, the operator moves the first tool unit 104a into its position of FIG. 22, on the right hand side of the tool carrier 14 such that the central portion 114a will enter the ball bearing 91, the end sections of the fixing pins 122, which protrude from the opposite side, entering the coupling holes 117a of the central portion 114a, and the shelf 115a will contact the inner ball bearing ring 93, such that the inner ball bearing ring 93 will be accommodated between the shelfs 115a and 115b, at the same time as the cylindrical surfaces 118a and 118b of the central portions 114a, 114b will contact the cylindrical surface of the inner ball bearing ring 93, and the peripheral, cylindrical surface 127a will adopt a position right in the major hole 28b in dish 24. The V-belt 72 may be further displaced by the beveled surface 112a in connection with the mounting of the tool unit 104a, such that it will adopt a position in the V-groove 134 that now is established between the two beveled surfaces 112a and 112b.

The assembly is completed by inserting the clamping screw 120 into and through the central, aligned holes 116a, 116b and screwing it into the clamping nut 121. Rotation of the tool units 104a and 104b of the tool assembly 15 relative to one another is prevented by the fixing pins 122, which extend through the aligned coupling holes 117a and 117b. The tool assembly 15 in turn can be locked e.g. by placing a locking pin through and between a peripheral recess 139a of the first blade cutter 16a and a facing recess 139b of the second blade cutter 16b. When turning the clamping screw 120, the locking pin will abut the lower edge of the tool carrier 14 and permit a high torque to be applied on the clamping screw head 123 by means of a spanner of considerable length. Naturally, also a pneumatic nut tightener may be employed for tightening the clamping screw 120. When tightening the screw- and nut coupling 103 through said high torque, the inner ball bearing ring 93 is clamped efficiently between the shelf's 115a and 115b. The end surfaces 119a and 119b of the protruding central portions 114a and 114b approach one another as the end walls 107a, 107b may be somewhat deflected because of the clamping nut's 120 high torque. This may eventually cause the said end surfaces 119a and 119b to meet, but even if they do, eliminating the original gap 136 between them, the optionally tensioned end walls 107a and 107b may actively contribute to the efficient clamping of the inner ball bearing ring 93. It should also be mentioned in this connection that a small play 137a and 137b will remain between on one hand the sides of the outer ball bearing ring 94 and the annular shields 95 and on the other hand the driving wheel halves 102a and 102b in the regions of the annular recesses 113a and 113b, respectively, allowing the inner ball bearing ring 93 and hence the entire tool assembly 15 to rotate freely in the outer ball bearing ring 94, which remains stationary in the ball bearing assembly 100.

Finally, the V-belt 72 is tensioned by means of the belt tensioner of the cutter 1, whereupon the tool carrier 14 is clamped to the machine body 3 by tightening the nuts 32.

Dismantling of the tool assembly 15 is, with reference to the above description of the assembling operations, carried out the other way round and should not require any particular explanation.

Now, as far as the mode of the cutter's 1 operation is concerned, this is basically the same as the mode of working described in EP-1,252,956-A1, the disclosure of which is therefore provided in the following.

In the building industry, cutting openings for doors, windows, ventilation ducts, stairways, foundations, etc. through objects such as walls, roofs, and floors are frequent operations. Objects of this type often are thick and they typically consist of reinforced concrete, stone, brick, masonry, metal, wallboard, paneling, and similar building materials, or various composite building materials. Various techniques are employed for performing the cutting operations. Known mechanical working machines are used, such as chain saw machines or ring cutter machines, that have various advantages as well as disadvantages.

Chain saw machines employed for cutting hard materials, such as stone and concrete are diamond-tipped. Typically these machines have a guide bar and a saw chain of a considerable length, which makes it possible to cut/penetrate thick objects. Among the drawbacks of such machines is that the wear of the links of the saw chain is severe when cutting materials of the mentioned type. Such wear shortens the use life of the saw chain. Wear shortening of use life is a serious drawback, especially because diamond tipped saw chains are very expensive. Another drawback is that very powerful engines are required for this machines type. Further, also the guide bar and the drive wheels are subjected to wear because of the slurry that is generated during the work, especially because the chain slides in a groove in the guide bar and because only water is used as a lubricant. The guide bar and the drive wheel therefore also frequently need to be replaced.

As far as cutting machines that have rotating cutting or sawing disks of a conventional type are concerned, the maximal cutting depth is limited to less than half the diameter of the used cutting or sawing blade. This limited cutting depth is due to the fact that the rotation axis of the disk (blade), i.e. its spindle, always is longer than widths of the kerf (cut) that the blade makes in the object being cut. When larger objects are to be cut (e.g., when making openings in thick walls, roofs or floors), machines having very large, rotating blades need to be used. However, larger blades and the associated powerful driving motors required to rotate larger blades result in an increase in weight and a decrease in portability/maneuverability. Conventional machines that are used for cutting and/or sawing very thick objects therefore are not hand-held machines. Vice versa, hand-held cutting machines of conventional type can be used only for working comparatively thin objects. A machine belonging to this category is shown, e.g., in U.S. Pat. No. 3,583,106.

Cutting machines of the ring saw type (see for example, U.S. Pat. No. 4,646,607), has an off-center drive of the cutter blade. As such, there is a lack of a hindering central spindle, which in turn allows cutting to greater depths than half the diameter of the saw blade. However, the diameter of handheld machines of the ring saw type is limited because of the weight of the machine, which will be considerably large if the blade is large, especially as big blades also need to be comparatively thick in order to be of sufficient strength. As is the case for other conventional cutting machines, the necessary drive power is increased in relation to the diameter of the blade, which further increases the total weight of the machine. When the blade is diamond-tipped, the costs for the diamond tipping is also increased very much if the diameter as well as the thickness of the blade are increased. Therefore, there are technical as well as economical limitations of the blade size, which in turn restrict the feasibility of this type of machines as far as the thickness of the object to be worked (i.e., cut) is concerned.

A so-called flat sawing machine is a special type of cutting machine. An example of this type of machine is shown in U.S. Pat. No. 5,887,579. The saw blade of a machine of this type has one side that is flat, i.e. it is void of projecting parts. On the opposite side there is a spindle, which is driven by a driving assembly at the side of the saw blade. Machines of this type are used in order to make sawing, e.g., into a wall at a corner where two walls intersect, possible. In such a situation, the flat side of the saw blade is applied close to one of the walls to permit the saw blade to cut into the other wall in the corner. It is to be noted that such a machine, however, can only be used for cutting walls, which are thinner than slightly less than half the diameter of the saw/cutting blade.

Further it is known through WO 01/23157 to dig into an object, more particularly into a rock formation desired to be mined in connection with a quarrying process, wherein two slots are cut into the rock at a distance from one another. In a subsequent operation, the rock material between the slots is crushed. The tools in this case are rotated about a joint axle having axle spindles, which project laterally from the outer sides of the outer tools of the tool assembly. The axle spindles set a limit for the penetration depth. Alternatively, a very broad trench may be achieved through several working operations, which allows working deeper into the rock formation, so that finally a ditch-like trench having stair-stepped or sloping walls is achieved.

In light of the above background there is a long felt need of machines of improved performance. Specifically there is a need to cut deeper than what has been possible to do according to the prior art, employing disk shaped, rotatable tools having a certain diameter. It is particularly desirable to make it easy to handle the machine, not only during the cutting or corresponding operation but also, e.g. in connection with exchange of replacement parts, in the first place of the tools. It is also desirable to reduce the number of machine components that must handled in connection with a change of tools. For these and other reasons, it is desirable to be able to use tool units that include a tool and a driving member as will be described in the following disclosure and to adapt the cutting machine to such tool units.

The tool arrangement includes a first disk-shaped tool rotatable about an axis and having an axially outer side defining a first maximum tool arrangement boundary along the axis. The first tool has a radially outer peripheral cutting edge portion. The tool arrangement includes a second disk-shaped tool rotatable about the axis and having an axially outer side defining a second maximum tool arrangement boundary along the axis. The second tool has a radially outer peripheral cutting edge portion. The tool arrangement has a driving arrangement, at an axial location between the first and second tools, for supporting the first and second tools for rotation and transferring driving force from a transmission member to rotate the first and second tools. A radially outer periphery of the driving arrangement is at a radius less than a radius of the peripheral cutting edge portion of the first tool and less than a radius of the peripheral cutting edge portion of the second tool to permit the first and second tools to engage a material to be cut without engagement of the driving arrangement with the material to be cut.

In accordance with another aspect, a cutting machine is provided for cutting through a material. The machine includes a machine body containing a power source, and a tool carrier extending from the machine body and the contained power source. The machine includes a power transmission arrangement extending from the machine body and the contained power source along the tool carrier, and a tool arrangement supported on the tool carrier. The tool arrangement includes a first disk-shaped tool rotatable about an axis and having an axially outer side defining a first maximum tool arrangement boundary along the axis. The first tool has a radially outer peripheral cutting edge portion. The tool arrangement includes a second disk-shaped tool rotatable about the axis and having an axially outer side defining a second maximum tool arrangement boundary along the axis. The second tool has a radially outer peripheral cutting edge portion. The tool arrangement has a driving arrangement, at an axial location between the first and second tools, for supporting the first and second tools for rotation and transferring driving force from a transmission member to rotate the first and second tools. A radially outer periphery of the driving arrangement is at a radius less than a radius of the peripheral cutting edge portion of the first tool and less than a radius of the peripheral cutting edge portion of the second tool to permit the first and second tools to engage a material to be cut without engagement of the driving arrangement with the material to be cut.

In accordance with yet another aspect, a material cutting and removal method is provided. The method includes simultaneously cutting, with a rotary tool arrangement having a rotary axis, two substantially parallel kerfs into the material such that material is left uncut between the two kerfs. At least part of the uncut material between the two kerfs is removed. The method also includes the subsequential step of simultaneously cutting, with the rotary tool arrangement, to extend the two kerfs to a cut depth greater than a maximum radius of the rotary tool.

In accordance with still another aspect, a tool unit for a cutting machine is provided, the tool unit is for cooperation with another tool unit within an assembly to accomplish cutting by the cutting machine. The tool unit includes a disk-shaped tool rotatable about an axis and having an axially outer side defining a first maximum tool unit boundary along the axis. The tool has a radially outer peripheral cutting edge portion. The tool unit includes a portion of a driving arrangement located adjacent to the tool. The portion of the driving arrangement supporting the tool for rotation and the driving arrangement transferring driving force from a transmission member to rotate the tool. A radially outer periphery of the portion of the driving arrangement is at a radius less than a radius of the peripheral cutting edge portion of the tool to permit the tool to engage a material to be cut without engagement of the portion of the driving arrangement with the material to be cut. The portion of the driving arrangement includes a driving wheel half, the driving wheel half is configured to mate with a driving wheel half of the other tool unit and, as mated, provide a driving wheel within the tool assembly.

The foregoing and other features and advantages will become apparent to one skilled in the art to which the tool relates upon consideration of the following description with reference to the additionally accompanying drawings, wherein:

Description of Example Embodiments

Figure 26:
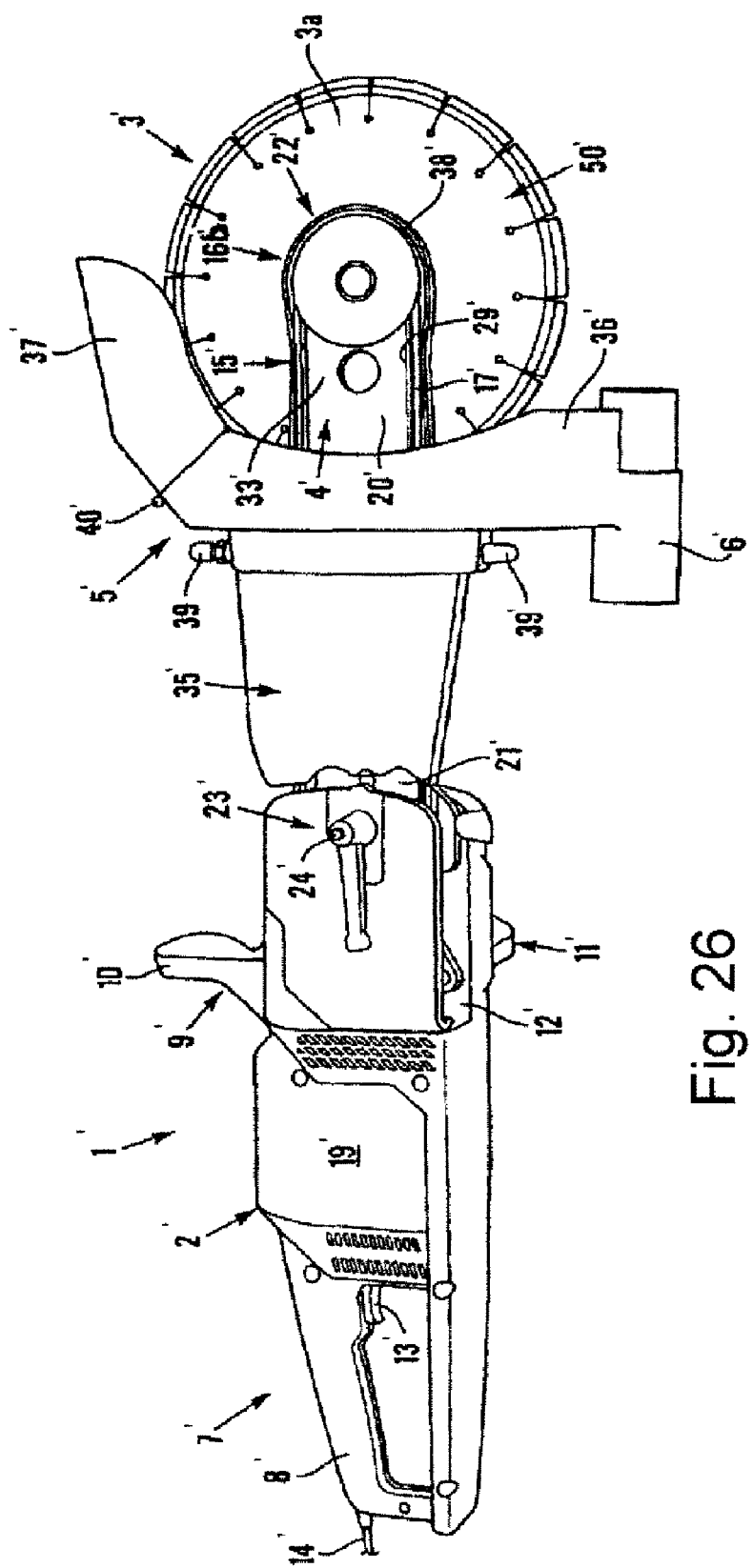
FIG. 26 is a schematic side view of a machine according to a first machine embodiment, with certain parts in one position.

FIG. 26 schematically shows a first embodiment of a cutting machine 1' in accordance with the tool for working on (i.e., cutting into the material) an object. It is to be appreciated that the term cutting is to be broadly interpreted to mean the removal of material from the object. The term cutting is to be interpreted to include sawing. Also, the term object is to be interpreted to mean any object, such as a work piece or blank. Further, the term object includes building constructions/materials having a large extension dimensions, for example a concrete construction, and more limited working pieces, such as a single stone block.

The machine 1' includes a rotatable, disk-shaped tool 3' that rotates to perform cutting working on the object. In the example shown in the FIG. 26, one tool is provided and is discussed further in detail hereinafter. The single tool 3' provides one aspect of the tool. However, it is to be appreciated that a second tool may also be provided. Such provision of two tools is another aspect of the tool and is discussed subsequently herein below.

Turning attention to the embodiment of FIG. 26, another portion (i.e., portion 2') of the machine 1' includes a power source (e.g., a motor such as an electric motor) that provides driving force to other main parts via a suitable power transmission in order to accomplish the cutting. In the example, the power source is located distal from the tool 3' and is not in direct connection to the tool. In the illustrated example, the power source includes a motor in a machine body 2', which is located at a radial distance from a rotational axis of the tool 3'. The machine body 2' thus may consist of a machine body of a known, conventional hand-held or mobile cutting or sawing machine. As such, the machine body 2' may include a combustion engine or motor, an electric motor, a hydraulic motor, or a pneumatic motor.

A transmission and carrying unit 4' is located between the machine body 2' and the tool 3'. The unit 4' transmits power from the motor in the machine body 2' to the tool 3'. Also, the unit supports (e.g., holds at a location) the tool 3' at a certain, defined distance from the machine body 2'. It is to be noted that the defined distance typically exceeds a maximum radius of the tool 3', and may even greatly exceed the radius of the tool.

Figure 27:
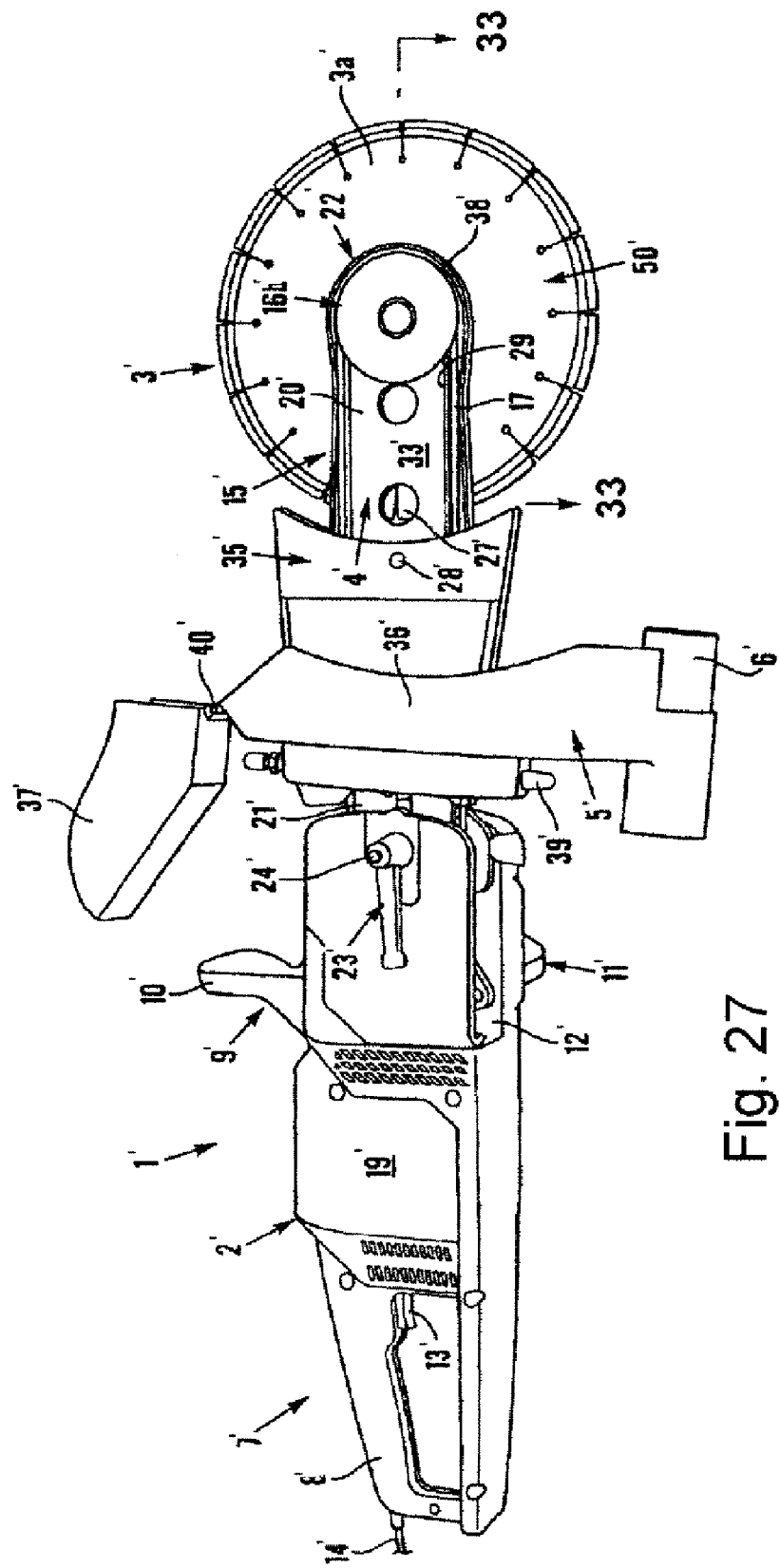
FIG. 27 is a view similar to FIG. 26, but with the certain parts in another position.
Figure 28:
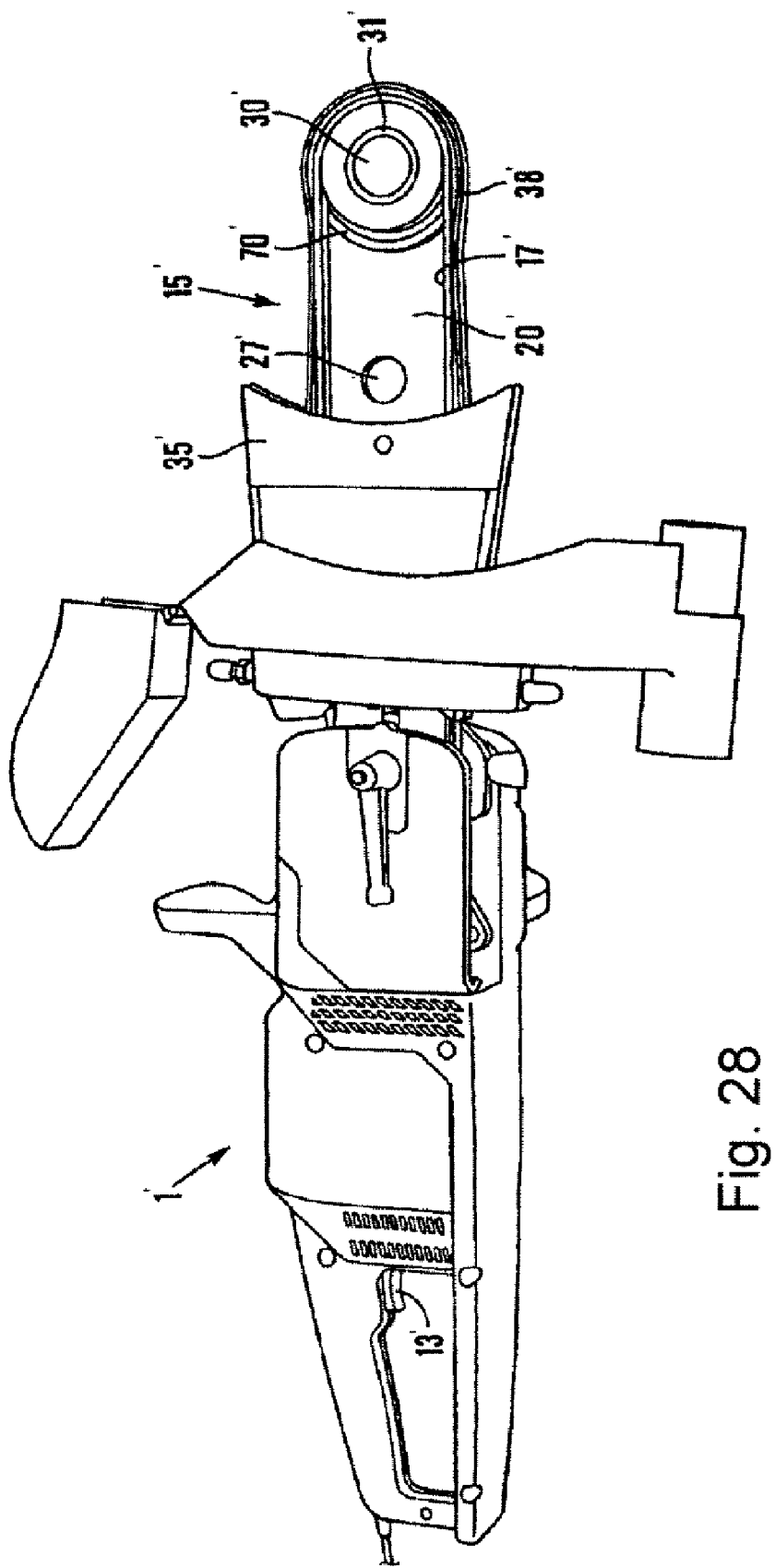
FIG. 28 is a view similar to FIG. 27, but with some parts removed.

It is to be appreciated that the machine 1' may include one or more guards (e.g., 5', see FIGS. 26-28). It is to be appreciated that the presence of such one or more guards in the shown examples is not to be construed as a limitation on the tool. As such, one example of such a guard structure is an adjustable tool guard 5', which is located in close proximity to a portion (e.g., a rear portion) of the tool 3'. Also, it to be appreciated that the machine 1' may include other structures that are not to be construed as limitations on the tool. For example, as shown in the Figures, a retainer 6' for a possible vacuum dust cleaner device in provided. The dust cleaner device or devices, however, are not shown in any detail. As other examples of other structures that may be included in the machine include devices for spraying water or the like, etc.

Turning again to the machine body 2', the shown example machine body includes a rear gripping appliance 7' with a rear control handle 8' and a front gripping appliance 9' with a front control handle 10' for manual grasping and controlling the machine 1' when pressing the tool 3' against the object to be cut. As another example of some additionally provided structure, a control handle guard 11' is located on a tool side (i.e., front side) of the front control handle 10'.

The machine body 2' also includes a chassis 12'. The motor, a motor control 13' (e.g., with an optional variable-speed gear drive and coupling), and various conduits and cables (e.g., for cooling water, hydraulic oil, electric power supply, vacuum dust cleaning, etc.) are mounted on or to the chassis 12' (not shown in detail). The motor control 13', may be in the form of a trigger-type switch, and is shown to be located at the rear control handle 8'. It is to be appreciated that in concert with the motor, there is provided a bearing housing with a suitable bearing, from which a rotatable axle shaft projects, on which shaft there is provided a first, rear driving wheel (not shown), which suitably consists of a gear, a belt pulley, or any other suitable drive for moving a power transmission device 17' along, around or inside the transmission and carrying unit 4' for driving a second, front driving wheel 16b', which is connected to rotate with the tool 3'.

In one example, the power transmission device 17' consists of a flexible, endless member in the form of a chain, driving belt or V-belt, driving band, or any other similar, suitable device, the cross section and construction of which are adapted to the rear and front driving wheels/driving members. In the discussed example, the power transmission device 17' is a V-belt. The invention, however, is not restricted to only flexible, endless transmission devices, such as a V-belt 17'. It is contemplated that other suitable power transmission devices exist, or can be suggested, and such other devices may be employed within the scope of the tool. One possible example of such other devices is a series of cooperating gears along the transmission and carrying unit 4'.

Many of the machine elements mentioned in the preceding paragraphs may consist of well-known machine components. Therefore, such machine components are not described in detail and some are not shown, but it is to be understood that the components are present and may be located behind a number of guards (e.g., 19') enclosing such structural elements. Here also, these guards 19' are optional and are typically removably attached in any suitable manner.

Turning again to the transmission and carrying unit 4', the shown example of the unit has an elongated construction and includes a flat, elongate bar 20' for carrying the tool 3'. Hereinafter, the transmission and carrying unit 4' may also be referred to as tool carrier. The transmission and carrying unit 4' supports the front driving wheel 16b', and the V-belt 17' engaged thereat, at a certain, defined distance from the machine body 2'. The bar 20' includes a first, rear end 21', which is provided to be removably mounted to the machine body 2'. A second, front end 22' of the bar 20' is located away from the machine body 2'. The tool 3' is rotatably mounted at the region of the front end 22'.

At the rear end 21' of the bar 20', a fastening and stretching device 23' is provided. The bar 20' is adjustably connected to the machine body 2' via the fastening and stretching device 23', and the V-belt 17' is tensioned (e.g., stretched) via the fastening and stretching device. In the shown example, the construction of the fastening and stretching device 23' may be of known construction. For example, the fastening and stretching device 23' may include screw joints which may be tightened and eased via a number of screws and nuts, or the like, such as fastening member 24', for securing the bar 20' relative to the machine body 2'. By the provision of adjustment opening(s) and fastening members, the bar 20' can be adjusted relative to the machine body 2' in the direction extending parallel to the elongation of the bar. For clarity, the adjustment direction is within a center plane 26' (FIG. 33) of the bar 20'. In the illustrated example, a number of weight and material reducing openings 27' (See FIGS. 27 and 28) are provided in the bar 20'.

Turning to specifics of the bar 20', the rear end 21' may have a blunt basic shape, and the bar may have a rectangular cross section towards the front end 22'. More specifically, the rear end 21' is arranged at a square angle relative to longitudinal edges 29' of the bar 20'. The rear end 21' is adjustably mounted adjacent to the rear driving wheel, and due to the above mentioned fastening and stretching device 23', the rear end 21' is movable in a direction from or towards the rear driving wheel. As such, the V-belt 17' can be dismounted when it is worn out and be replaced by a new one. Within the shown embodiment, the V-belt 17' is provided to run along and parallel with the edges 29' of the bar 20' in the center plane 26' of the bar 20', but at a distance from the edges 29' of the bar. It is contemplated that the bar 20' and the V-belt 17' could be configured/modified such that the V-belt runs in a groove provided in the bar edges 29'.

The bar front end 22' has a rounded shape according to the illustrated example and comprises a hole 30' (FIG. 3) in the bar 20'. The hole 30' is concentric and centrally located relative to the rounded shape. The hole 30' is adapted for a suitable bearing 31', e.g., a ball bearing or a sliding bearing. The bearing 31' fits within the hole 30' such that little or no play occurs between the bearing and the bar 20'.

Returning attention to the several guards (e.g., tool guard 5'), it is to be appreciated that typically the guards will be provided to at least partially cover and cooperate with the transmission and carrying unit 4'. In the shown example, a fixedly mounted, double walled side guard 35' is provided for the transmission and carrying unit 4'. A blade guard section 36' of the guard 5' is movably provided on the side guard 35' along the bar 20'. Another section 37' of the guard 5' is connected to the blade guard section 36' via a hinge 40', and is thus pivotable relative to the blade guard section 36', the side guard 35', the transmission and carrying unit 4', and the tool 3'. An edge guard 38' is provided for the V-belt 17'. The edge guard 38' extends along an outer periphery of the V-belt 17' and around the front end 22' of the bar 20'.

The side guard 35' is typically fixed relative to the bar 20'. In one example, one end of the side guard 35' is welded to the bar 20' (e.g., at a generally flat surface 33' of the bar), and the other end of the side guard is fastened to the bar by a screw fastener. It is contemplated that the displacement of the tool guard 5' relative to the side guard 35' may be by any suitable mechanism and manner. Also, it is contemplated that the tool guard 5' may even be locked in place relative to the side guard 35'. Locking elements 39' are schematically represented within the figures to indicate the ability to lock the guard 5' relative to the side guard 35'.

Figure 30:
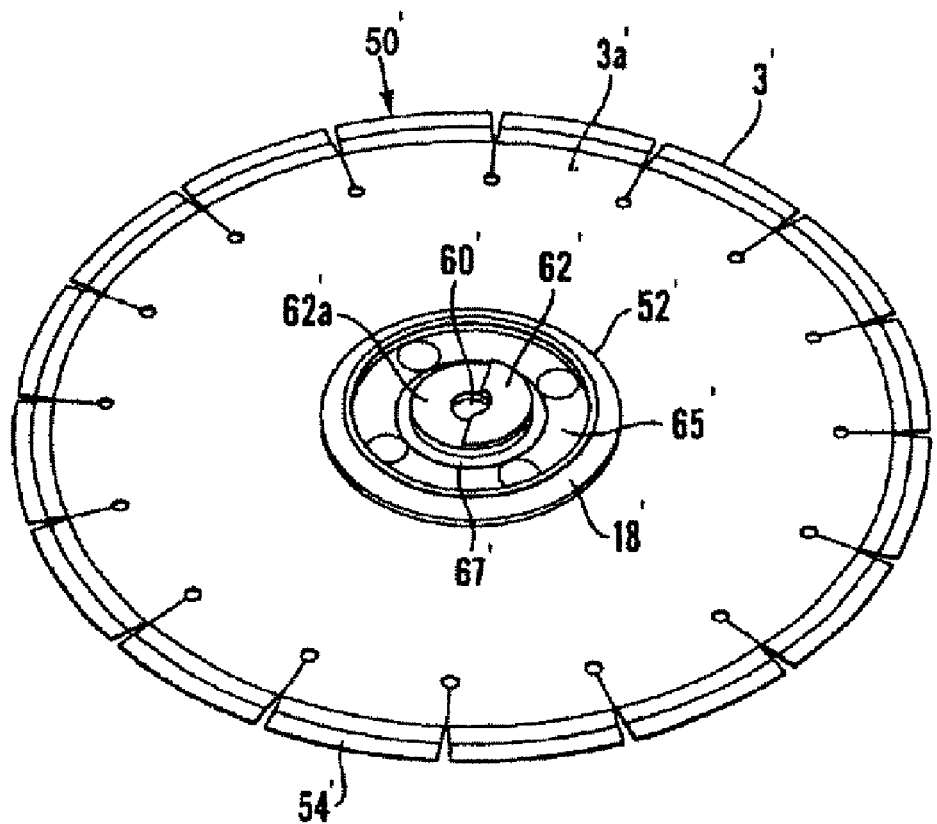
FIG. 30 shows a tool and a driving wheel half of a tool unit according to the present invention and usable for either of the first and second machine embodiments shown in FIGS. 26-29.
Figure 31:
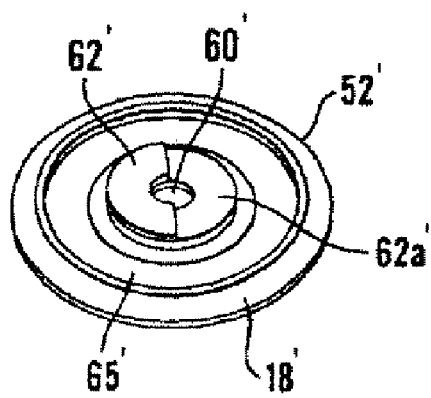
FIG. 31 shows the driving wheel half of FIG. 30.

It is to be appreciated that the front driving wheel 16b' has a unique construction. Specifically, the front driving wheel 16b' is comprised of two halves. One driving wheel half 52' is shown in FIGS. 30 and 31. In particular, FIG. 30 illustrates the driving wheel half 52' is associated with the tool 3'. This associated set of structural elements provides a tool unit 50'.

Figure 32:
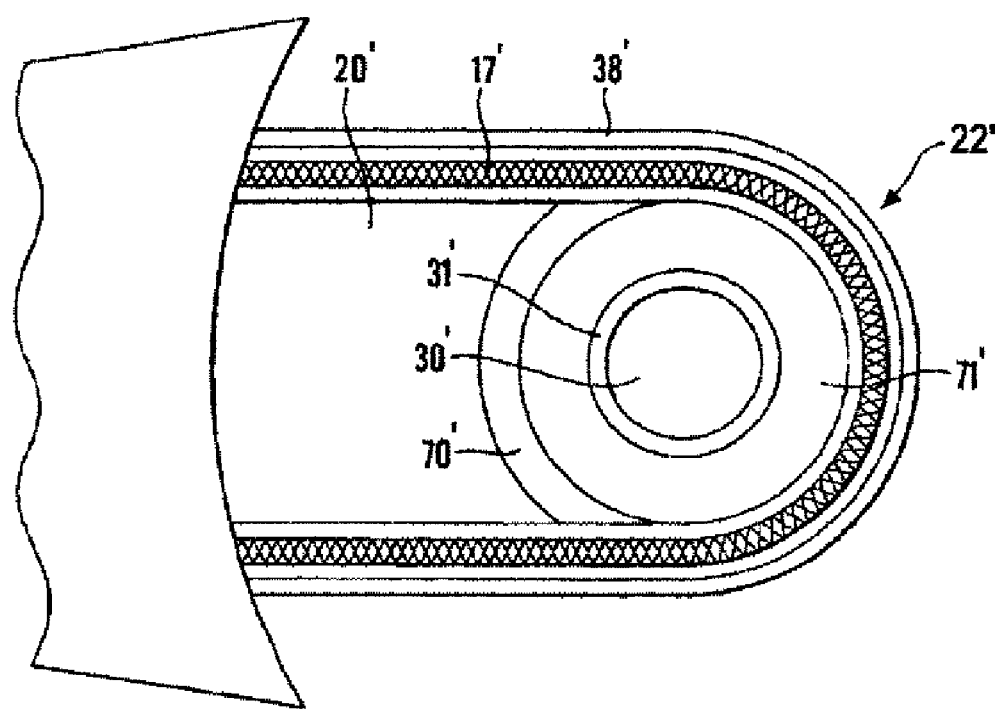
FIG. 32 is an enlarged fragmentary view of a front portion of the machine shown in FIG. 28.
Figure 33:
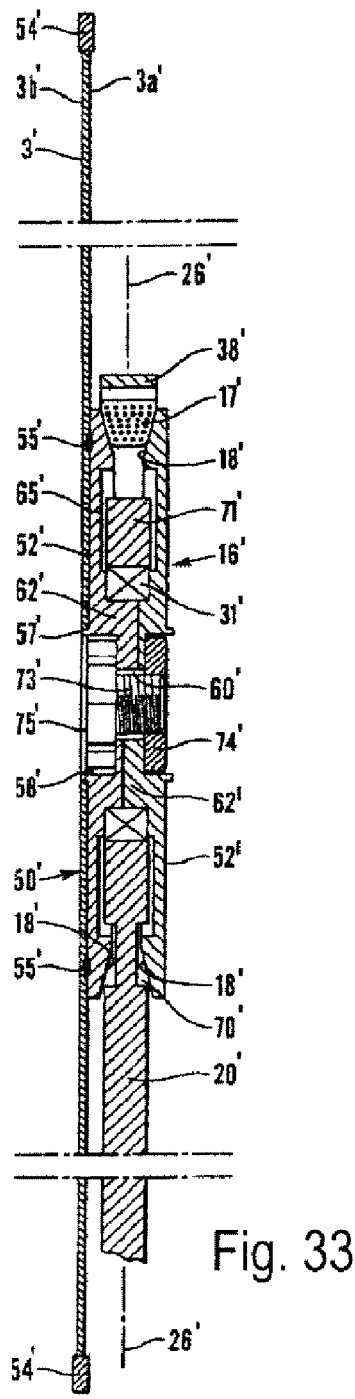
FIG. 33 is a view along the line 8-8 in FIG. 27.

With reference to FIGS. 30-33 and 35', details of the tool 3', the tool unit 50', and associated structures at the front end 22' are provided. As shown in FIGS. 30 and 33, the tool 3' consists of a flat disk with two sides 3a', 3b', a peripheral edge portion 54' of which is thicker, i.e. has a larger lateral extension than the rest of the tool, and constitutes the working part of the tool 3'. The edge portion 54' may be equipped/tipped with diamonds, carborundum, or other grinding agents, or may be provided with teeth, etc. The tool 3' and the driving wheel half 52' may be united with one another through welding (e.g., spot welding or laser welding), soldering, gluing, riveting, or other fastening mechanism. In the shown example of FIG. 33, the tool 3' and the driving wheel half 52' of the tool unit 50' are united with one another by spot welding 55'.

Figure 35:
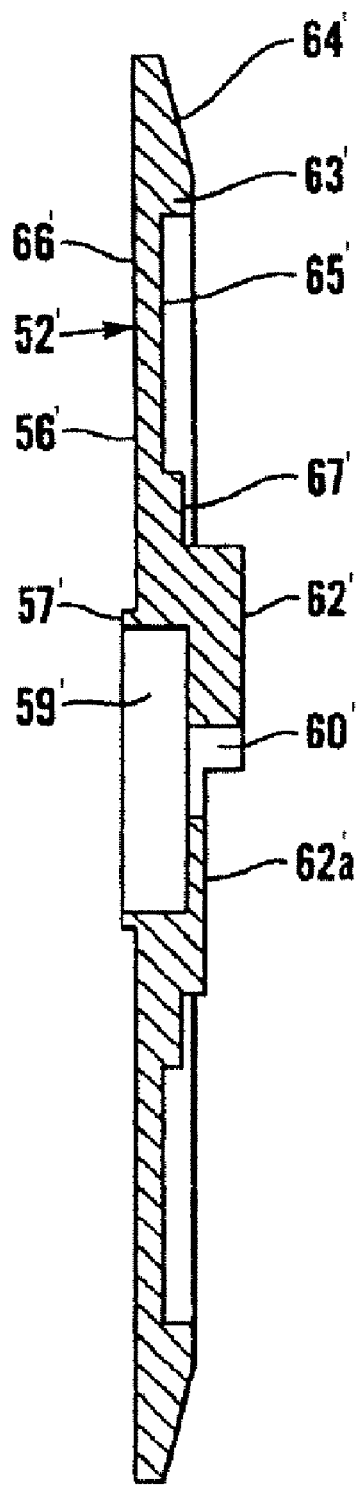
FIG. 35 is an axial cut view of the driving wheel half shown in either FIG. 33 or FIG. 34.

The driving wheel half 52' has a side 56' (FIG. 35) that is flat in order to be able to contact the tool 3' of the integrated tool unit 50'. An annular projection 57' is designed such that it can extend into and fit in a central hole 58' (FIG. 33) of the tool 3'. Radially inside of the annular projection 57' there is a circular recess 59' (FIG. 35). A central hole 60' extends through the driving wheel half 52'.

On the side of the driving wheel half 52' that is distal from the tool 3', there is a central axle part 62' that provides an axle spindle. Also on the side distal from the tool, a radially outer peripheral part 63' of the driving wheel half 52' is provided with a beveled surface 64'. Radially between the peripheral part 63' and the axle part 62' is a major, annular recess 65', so that a reduced-thickness web 66' is located between the recess 65' and the flat side 56'. Radially inside of the recess 65' there is an annular, thicker portion 67'.

The front driving wheel 16b' is formed of two discrete and, according to one embodiment, identically shaped driving wheel halves 52" (FIG. 33) that are provided such that the axle parts/axle spindles 62', 62" are turned towards one another to form an assembled wheel shaft. This, however, does not prevent the driving wheel halves/driving members from having different shapes, provided their functional basic principles are the same. In order to provide a coupling between the axle parts 62', 62", the axle part of each driving wheel half 52', 52", according to the embodiment, is cut-down a distance in that segment (i.e., 62a') of the axle parts 62', 62" which in the front driving wheel 16b' are turned towards one another. One such cut-down portion has been designated 62a' in FIG. 35 and is semicircular. It should be understood that also other coupling devices can be conceived, e.g. pins and holes in and on the axle parts/axle spindles 62', 62" that are turned towards one another.

As mentioned, the front driving wheel 16b' is formed of two driving wheel halves 52', 52" that are substantially identical. Specifically, the two driving wheel halves 52', 52" may both be of the construction shown in FIG. 35. As shown in FIG. 33, the two driving wheel halves 52', 52" are brought together against one another in a mating position. In order to provide the mating between the driving wheel halves 52', 52", one of the driving wheel halves is turned 180.degree. relative to the other one, so that the cut-down portion 62a' at the central axle part 62' of one of the driving wheel halves abuts a non-cut portion of the central axle part 62' of the other driving wheel half. Between the thus brought together driving wheel halves 52', 52" there is formed a wedge-shaped groove 18' by the beveled surfaces 64' (see FIG. 33). The V-belt 17' is located within the groove 18' and engages the beveled surfaces 64' in order to transfer rotational force to the driving wheel halves 52', 52" and thus the tool 3'. As such, the front driving wheel 16b' provides a driving arrangement.

As shown in FIGS. 32 and 33, the region of the front end 22' of the bar 20' includes the centrally placed hole 30', in which the bearing 31' is located. An annular recess 70' is concentric with the hole 30' and dimensioned and located such that it can accommodate the peripheral part 63' (see FIGS. 33 and 35) of a driving wheel halves 52', 52". It is to be appreciated that a respective recess 70' is located on each of the two planer sides of the bar 20'. It is to be appreciated that one or both of the recesses 70' may be provided with an increased radial dimension to accommodate the peripheral parts 63' of smaller/larger radius driving wheel halves.

FIG. 32 also shows how the V-belt 17' extends along the bar 20' and around the front end 22' at a small distance from the bar 20' and is surrounded by the edge guard 38' at a small distance outside of the V-belt 17'. The edge guard 38' consists of a rail (e.g., a steel rail) that has a breadth similar to the breath of the V-belt 17'.

During the assembly, the tool unit 50' with the wheel half 52' is moved axially toward the hole 30' in the front end 22'. The axle part 62' on the wheel half 52' is moved into the hole 30' until the annular, thicker portion 67' abuts the bearing 31'. In a corresponding way, the other driving wheel half 52" is moved, on the opposite side of the bar, into the hole 30', turned 180. degree. relative to the first inserted driving wheel half 52', so that the axle parts 62', 62" of the two driving wheel halves mate against each other and abut against the bearing 31'. An annular part 71', which surrounds the bearing 31', and which is bounded by the annular recess 70', is accommodated in the annular recess 65' of the driving wheel halves 52', 52".

The two driving wheel halves 52', 52" are fixed to one another by means of a screw 73' (FIG. 33), which extends through the holes 60' of the driving wheel halves, and a nut 74'. A screw head 75' of the screw 73' and the nut 74' are accommodated in the recesses 59' in the driving wheel halves 52', 52". Thus, the screw 73' and nut do not extend along the rotational axis beyond the driving wheel halves 52', 52", and the screw does not extend beyond the tool 3'.

By longitudinal displacement of the bar 20' forward from the machine body 2' via the fastening and stretching device 23', the V-belt 17' is caused to adopt a proper position in the wedge-shaped groove 18'. Specifically, a suitable contact pressure against the two beveled surfaces 64', which between them form the wedge-shaped groove 18', is achieved.

It is to be noted that in accordance with the tool, the tool 3' provides the maximum axial (i.e., rotational axis) extent of the tool unit 50'. As shown in FIG. 33, the maximum axial extent is at the left side 3b' of the shown structure. In fact, the tool 3' provides the maximum axial extent of all of the structure shown in FIG. 33. In the specific example shown, the peripheral edge portion 54' provided the maximum axial extent, and, as the tool 3' is rotated, the left-most side of the peripheral edge portion 54' sweeps in a plane transverse to the rotational axis that is at the maximum axial extent. As such, it is to be appreciated that there is no impediment, at least on the left side as shown in FIG. 33, to the tool 3' being operated to cut at a location into material that is deeper than the radius of the tool.

The transverse extent of the side guard 35' (FIG. 27) is less than the furthest axial extent of the tool 3'. Thus, the side guard 35', when the blade guard section 36' has been withdrawn along the side guard, can follow the tool 3' into a deep groove within which the tool is being used to cut right at a side of the groove.

Figure 29:
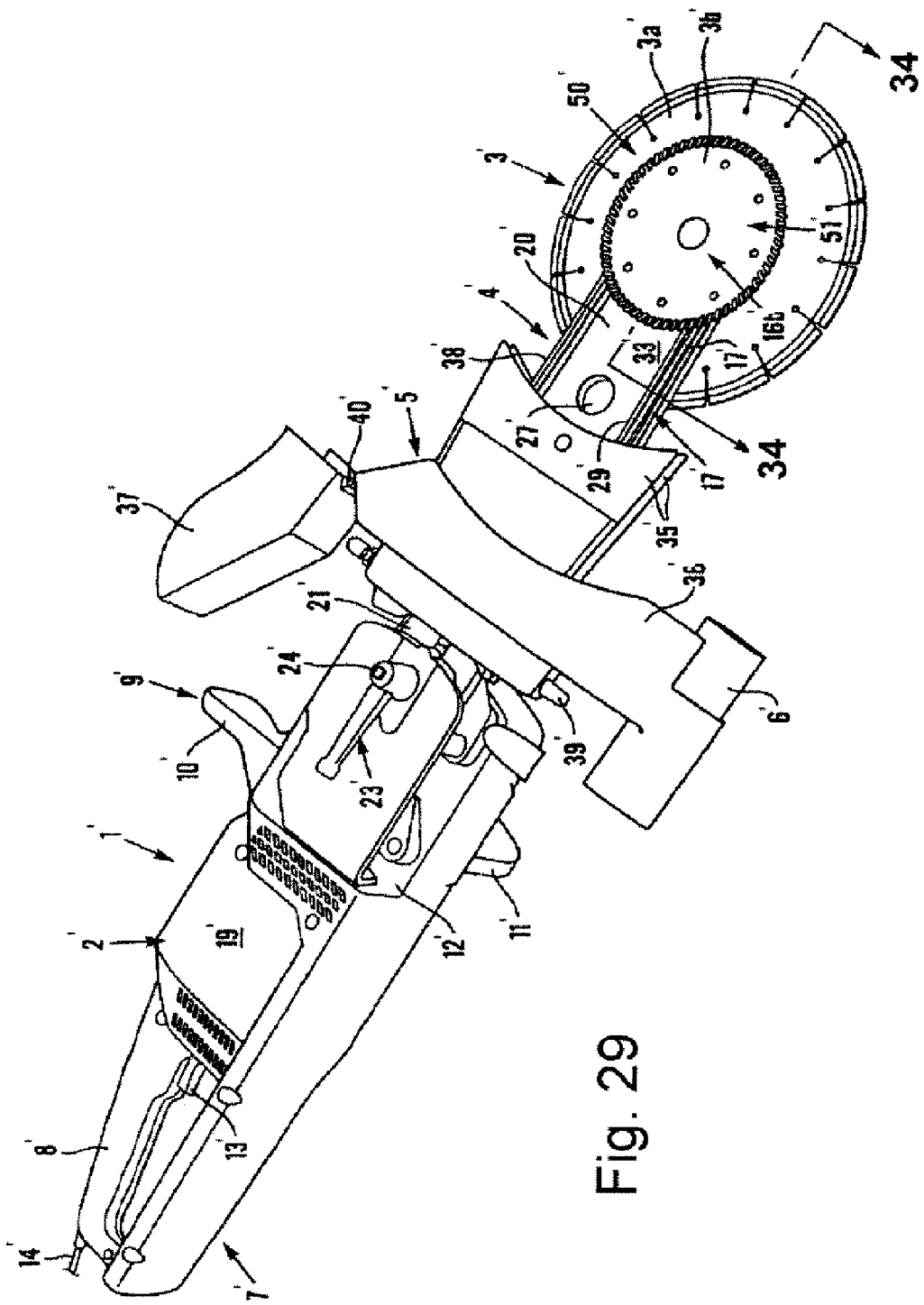
FIG. 29 is a schematic perspective view of a machine according to a second machine embodiment of the present invention.
Figure 34:
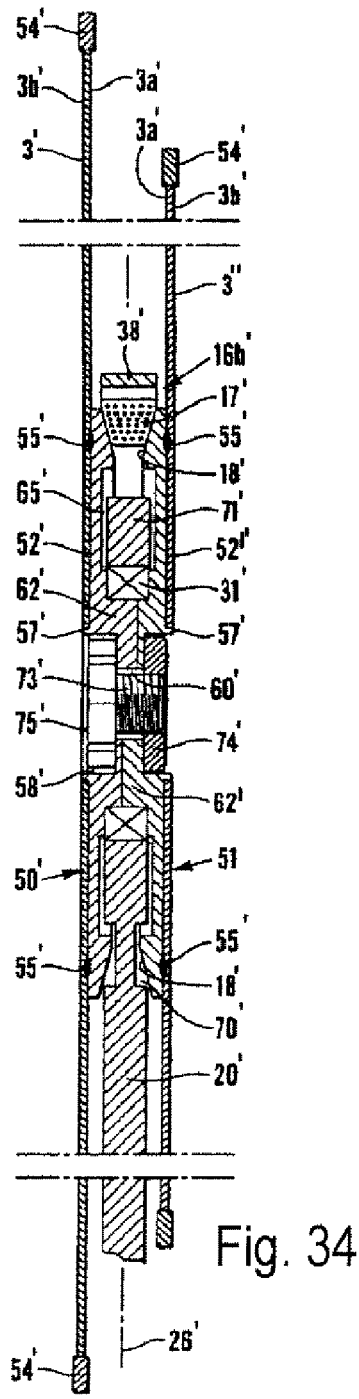
FIG. 34 is a view along the line 9-9 in FIG. 29.

The embodiment of the machine shown in FIG. 29 and the specifics shown in FIG. 34 differ from embodiment and specifics of the first machine embodiment and the specifics shown in FIG. 33. Specifically, two tools 3', 3" are provided, and each of the two driving wheel halves 52', 52" are respectively part of two tool units 50' and 51'. As such, FIG. 34 shows one example of a tool arrangement. The second tool 3", identified in FIG. 34, has a smaller diameter than the first tool 3' that is included in the first tool unit 50'. In other respects, the design is the same as has been described with reference to FIG. 33, as well as the mode of assembly.

It is to be noted that in accordance with the tool, the tool 3' provides the maximum axial (i.e., rotational axis) extent of the tool unit 50', and the tool 3" provides the maximum axial extent of the tool unit 51'. As shown in FIG. 34, the maximum axial extent of the tool unit 50' is at the left side and the maximum axial extent of the tool unit 51' is at the right side. In fact, the tools 3', and 3" provide the axially furthest boundaries of all of the structure shown in FIG. 33. In the specific example shown, the peripheral edge portions 54' provide the maximum axial extents. When each respective tool 3', 3" is rotated, the peripheral edge portion 54' sweeps in a plane transverse to the rotational axis that is at the associated maximum axial extent. As such, it is to be appreciated that there is no impediment, at least on the outer left side and outer right side, as shown in FIG. 34, to the tool 3' being operated to cut at a location into material that is deeper than the radii of the tools 3', 3".

The thickness of the side guard 35', i.e. the transversal distance between the outer surfaces of the side guard, is smaller than the distance between the outer sides of the tools 3', 3", i.e. the second sides, which means that the side guard 35' can be entered into a groove, which, according to the method of using the machine of the invention is established in the object that is being worked, when the material between the kerfs (cuts) which have been made by the tools, has been removed, and when the groove having flat and parallel side walls has reached such a depth that also the side guard 35' can be entered in the groove, when the blade guard section 36' has been withdrawn along the side guard 35'.

On example method of working with the machine 1' and with the tool unit/tool units 50', 51', in accordance with the tool, is further explained. For this example explanation, it is assumed that the machine 1' is equipped with two tool units 50', 51', as shown in FIG. 29 and FIG. 34. Before starting the work, the tool guard 5' is moved forwards to a position similar to the position shown in FIG. 26. The motor in the machine body 2' is started. The operator controls the machine 1' so that the motor is caused to drive the V-belt 17'. Due to the engagement between the V-belt 17' and the wedge-shaped groove 18', the front driving wheel 16b' is rotated. As such, the tools 3' and 3" are caused to rotate.

Figure 36A:
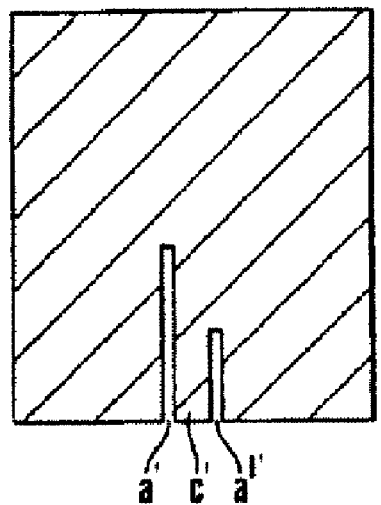
FIGS. 36A-36D show sequential views of a section of material of an object that is being worked in accordance with a method of the present the invention.

By pressing against the material of the object to be cut (see FIG. 36A), there is first established a first saw kerf in the object by means of the larger tool 3'. When the tool 3' has penetrated the object to a depth corresponding to the radial difference between the two tools 3' and 3", also the smaller tool 3" begins penetrating the object to form a second kerf in the object, parallel with the kerf that is formed by the larger tool 3'. The working can proceed in this way until the tools 3' and 3" have penetrated so deeply that the edge guard 38' touches the object. The initial kerfs, which thus are established in the object by means of the tools 3' and 3", are designated a and a', respectively, in FIG. 11A. The work proceeds until the kerfs a and a' in the object also have achieved a desired extent along the object. Specifically, during this phase, the machine 1' may be moved along the surface of the object with the edge guard 38' sliding against the object.

At least if the conditions are favorable, e.g. that the material of the object that is worked is not too tough, and/or if the distance between the established kerfs in the object are sufficiently short, the material c' between the kerfs a and a' loosens successively as the kerfs are formed because of vibrations from the tools and/or because of friction between the tools and the material between the kerfs. The work therefore can proceed continuously by moving the machine 1' along the surface of the object with the edge guard 38' sliding against the bottom of the wider groove that is being formed in the object. During this phase, the bar 20' and even the side guard 35', if the tool guard 5' is moved rearward, may eventually enter the groove being created due the lack of obstruction at the axial extends of the two tools 3' and 3".

Figure 36B:
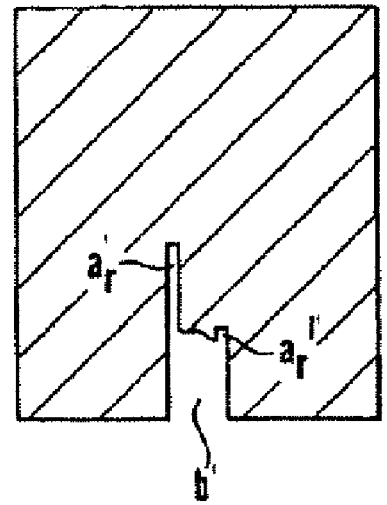

If the material c between the first kerfs a and a' does not loosen in connection with the establishment of the kerfs in the object, a methodology is employed to still allow deep cutting penetration into the material of the object. Specifically, after the initial kerfs are established, preferably when they also have achieved a desired length, the machine 1', and the tools 3', 3" thereof, is withdrawn from the object. Next, according to this mode of operating the machine according to the invention, the material c between the two first established kerfs a and a' in the object is removed. The technique, which is employed for removing this material, may depend on the kind of material of the object. As some examples the removal technique may include breaking, hammering, wedging, axing, knocking, vibrating, blowing, spraying, milling, drawing, prizing, or any combination of such techniques. Thus, there is established a wide groove b (FIG. 36B) in the object, which allows the tool units 50', 51' including the bar 20', the front driving wheel 16b' and the V-belt 17', the edge guard 38' and the side guard 35' to penetrate deeper into the object.

Figure 36C:
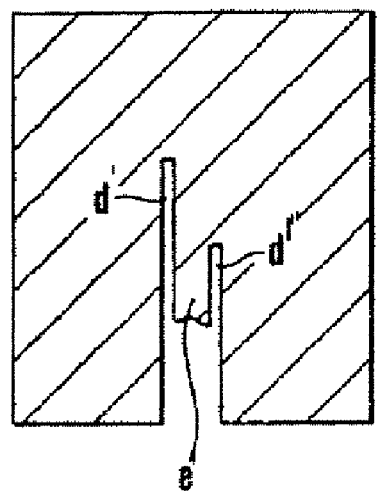
Figure 36D:
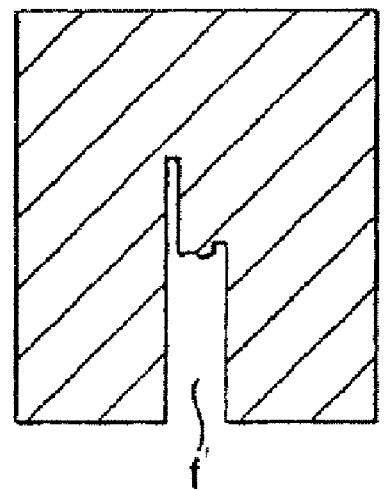

In the object, there remains a kerf portion $a_r$ of the kerf a, which was formed by the larger tool 3', and possibly a kerf portion $a_r'$ of the kerf a' which was formed by the smaller tool 3". These kerf portions $a_r$, $a_r'$ may be used as guiding trails during the next step of operation, when the operator drives the tools 3', 3" deeper into the object to make a next set of kerfs d and d', respectively, as shown in FIG. 36C. The material between the new kerfs d and d' is designated e within FIG. 36C. The material e can be removed in the same way as has been described in the foregoing, so that a deeper groove f (FIG. 36D) is provided. The work may proceed in this way by alternately establishing deeper and deeper parallel kerfs and removal of the material between the kerfs until the desired or maximal possible working depth has been achieved. The tool guard 5' may ultimately restrict increases in the working depth. It is understood that it is possible to work stepwise in this way into the object and that after each working operation by means of the tool units 50', 51', the material between the kerfs is removed, except after the last working operation, when the desired depth has been achieved by means of the larger tool 3'.

FIGS. 37 and 38 show an example of how a machine body 2' of known design, containing an electric driving motor, can be equipped according to the principles of the invention. Thus, in the front part of the machine 1' there is an elongated bar or tool carrier 20' in the form of a flat bar, carrying two diamond-tipped blade tools 3', 3" of the flat sawing type, each having a driving wheel half 52', 52" secured to the inner side of the saw blades. The tools 3', 3" in this example have equal radii, and are part of yet another example of a tool arrangement.

The tools 3', 3" are united with one another through recessed screws 80', which extend through a washer 81', which is recessed in one of the tools 3', 3". The screws 80' are secured by screwing in that driving wheel half 52" which is connected to the opposite tool 3".

A front blade guard section 36' is shown only schematically. It is displaceable along the bar 20', which is located adjacent to one side of the machine 1'. Suitably the blade guard section 36' and a rear driving belt guard 82' can be demounted in order also to make it possible to use the machine 1' for sawing close to walls, roofs, etc. in corners.

Accordingly it is to be appreciated that the tool, tool unit, machine, and method of the tool address the issue of cutting or penetrating thicker objects than what has been previously possible by means of disk shaped, rotatable tools having a certain diameter. According to a one aspect of the tool, a side of the tool defines a plane which forms a limit of the, in the axial direction, maximally projecting part of the tool assembly. As another aspect, the entire machine body is provided at a distance from the tool assembly with reference to the radial direction of the tool assembly, and that the tool carrier, which is elongated, extends from the machine body over the distance beyond the center of rotation. According to one aspect of the method of the invention, two substantially parallel kerfs are established to a certain depth in the object to be worked, that at least part of the material between the kerfs is removed, so that a wider groove is established in the object, and that at least one of the kerfs then is made deeper in the extension of the kerfs.

Typically, the width of the tool carrier is substantially larger than its thickness, wherein the width is the extension of the tool carrier in a plane that is parallel with the plane of the tool/the tools and perpendicular to the longitudinal direction of the tool carrier. Preferably, the tool carrier consists of an elongated bar of a shape that is conventional for guide bars in conventional chain saw machines, but also other designs, preferably flat bars, having a sufficient bending resistance in the radial direction of the tool/tools are conceivable. In principle, the tool carrier, which basically determines the maximal penetration depth of the tools into the object to be worked, may have a length that is limited only by practical circumstances in the same way as applies for a chain saw machine, i.e. circumstances such as the weight of the machine, which of course increases the longer the tool carrier is, which in turn makes the maneuverability of the machine more difficult.

In another aspect, a driving member is provided by the driving wheel having at least one circumferential driving surface. The driving wheel may include a first part and a second part, each of the parts having a circumferential driving surface. The driving surfaces are provided on each side of a plane, which is perpendicular to the axle of rotation of the driving wheel and located between the parts. Suitably, the two driving surfaces of the driving wheel, one on each one of the parts, are identically designed. Also the denomination "driving wheel half" is used in this context as a denomination of the driving members, when two such driving members in combination form a driving wheel. According to one aspect, the driving surface or driving surfaces form at least one power transmission groove for a power transmission device. More particularly, according to one aspect, the two driving surfaces consist of beveled surfaces on the parts, the beveled surfaces between them forming a V-belt groove for a power transmission device in the form of the V-belt.

According to one aspect, the parts of the driving wheel, each of which comprising a circumferential driving surface, are provided on each side of the tool carrier. Further, according to another aspect, a bearing is provided in the front end of the tool carrier. According to yet another aspect, the driving wheel has an axle, which extends through the tool carrier between the two driving wheel parts, and is journalled in the bearing in the tool carrier. Suitably, each of the two driving wheel parts has an axle spindle, the axle spindles extending towards one another and forming in combination the axle. This makes it possible, according to an aspect of the invention, to make the two driving wheel parts, including the axle spindles belonging to them, identical.

According to an aspect of a machine according to the invention, a tool assembly has at least two parallel, coaxial tools, comprising two outer tools, that each of the outer tools has a first side which is an inner side, a second side which is an outer side, and a peripheral edge portion which is the working part of the tool, and that that side of the peripheral edge portion of the outer tools which is part of the outer side of respective tool defines a plane, which forms a limit of the, in the radial direction, maximally projecting parts of the tool assembly in the region of the outer sides. It is to be appreciated that the number of rotatable, coaxial tools included in the tool assembly may be more than two.

It is to be appreciated that numeric dimensions are not intended to limit the scope of the tool. However, the following numeric information provides some examples. The smallest tool diameter is normally at least 60 mm, typically at least 80 mm, regardless as to whether the diameters of the two tools are equal or different. In the case the tools having different diameters, the diameter of the smallest tool normally has a maximum of 400 mm, preferably 250 mm, and suitably 150 mm. The larger tool may have a diameter that is at least 40 mm, preferably at least 60 mm, but not more than 100 mm larger diameter than the smallest tool. In the case when the tools have equal diameters, when the number of tools is two, the diameter should be at least 80 mm, but should normally not exceed 500 mm. Preferably, the diameter is 60 to 300 mm, suitably 80 to 250 mm. A very important advantage with small diameters over large diameters is that tools having a small diameter do not require as large engine power as tools having larger diameters. The reason why conventional cutting and saw machines nevertheless are provided with tools having large, and in some cases very large, diameters, is that large diameters are required in conventional machines for the achievement of a desired penetration depth, a condition which is eliminated by the invention.

With reference to the above-discussed example tool diameters, the distance between the tools, typically, is at least 5 mm, with a maximum of 100 mm. Even when the tool diameters lie within the upper part of the above mentioned dimension ranges, it is advantageous if the distance between the tools is small, and therefore the distance should be at a maximum of 50 mm, and suitably at 20 mm. A very important advantage with a short distance between the tools is that this essentially facilitates the removal of the material between the kerfs (cuts). If the distance between the kerfs is for instance not larger than the order of 10 or 15 mm, the material may, even if the material consists of, e.g., concrete or brick, even loosen successively as the kerfs are established, because of vibrations and friction between the tools and the material between the kerfs. Possibly, it may be necessary that the operator wobbles or sways the machine slightly in the lateral directions during the working operation. In other words, the need of a subsequent clearing operation for removing the material between the kerfs may be completely eliminated, or at least may such clearing operation be essentially facilitated.

In one aspect of the tool, the tool or each tool, respectively, is included in a tool unit comprising at least one disk shaped tool having a first side, a second side, a peripheral edge portion that is the working part of the tool, and at least one driving member that is coaxial with the tool. Another aspect is that the driving member is connected or connectable to the first side of the tool, and that that side of the peripheral edge portion which is part of the second side of tool defines a plane, which forms a limit of the, in the axial direction, maximally projecting part of the tool unit. Also, as an aspect, the driving member typically has at least one circumferential driving surface provided to be able to cooperate with a power transmission.

According to an aspect of the tool, at least the main part of the second side of the tool is essentially flat inside of the peripheral edge portion, which is the working part of the tool. The tool and the driving member of the tool unit may be made as two separate components, which subsequently have been permanently united to form an integrated unit. As an alternative, the tool and the driving member are made of a blank, which has been worked to adopt the final shape of tool unit. In the latter case, the driving member may be formed of a central portion of the tool blank, which has been pressed out in the axial direction of the tool unit and thereafter has been worked to achieve the final shape of the driving member.

According to still another aspect of the tool, the driving member and the tool consist of two separate components, which can be connected by means of follower and coupling members to form a tool unit. If, for example, the tool consists of a thin saw blade and if the central portion of the saw blade is pressed out to form a recess on that side which is opposite the side where the driving member is provided, a coupling member, e.g. a screw head or a nut, may be provided in that recess and pins or other followers may be provided on the driving member, the pins or other followers matching apertures in the pressed out central portion of the tool. In the case the tool instead consists of a cutter disk, a head of a screw which functions as a coupling member may be recessed in the cutter disk on the outer side thereof. Also in that case, followers in the form of pins and holes may be provided between the tool and the driving member/the driving wheel half for the purpose of providing a dismountable tool unit having a replaceable tool.

It is to be appreciated that various types of power transmission devices may be employed according to the invention, e.g. endless V-belts, toothed belts as mentioned above, etc., but in principle also an endless roller chain can be conceived, particularly a comparatively broad roller chain, cooperating with driving members in the form of sprockets, each of which is connected or connectable to a tool on one or both sides of the tool carrier.

Returning to the present subject matter from that of EP-1,252,956-A1 included above, the design of the cutter 1, in the first place the design of the tool carrier 14 and the tool assembly 15, makes it possible to work deeper into a working object than is possible to do by means of a conventional cutter with cutter blades of the same size. The maximal cutting depth is limited only by the length of the tool carrier, since the entire tool assembly 15 can be entered deeper and deeper into the groove that is established in the working object, once the material between the kerfs made by the two cutter blades has been removed. A new feature of the mode of operation, however, relates to the blade guards. Thus, the two front guards 18a, 18b are moved into the resulting groove in the working object, i.e. the groove that is established when the material has been removed between the two individual kerfs which are made by the two cutter blades. Further, the rear blade guard 19 is stationary, but is folded upwards and rearwards, sliding against the surface of the working object when the cutter blades have reached a certain depth. In operation, the front blade guards 18a, 18b are effective in the first place when they operate in the groove in the working object, preventing fragments of the working material from being hurled out from the groove at a high velocity against the cutter or against the operator, which could cause severe damage. The rear blade guard 19 can be regarded as a complement or as an alternative to the front blade guards, especially during the initial phase of the cutting operation, but basically it is an efficient splash guard. In this connection it should also be mentioned that the use of one, two or all the three blade guards 18a, 18b and 19 is optional. The choice may be made by the operator or by a responsible authority depending on the existing circumstances in terms of type of work, working material, supply or not supply of flushing water etc, and, not the least, be made to comply with existing safety rules.

The provision of the sealing element 140, FIG. 22b-FIG. 26, in the front part of the tool carrier is optional but is recommended, because inflow of liquid into the driving wheel consisting of the two driving members 102a and 102b could give rise to slip between the V-belt and the V-groove surfaces 112a,b. The sealing members of the sealing element are two annular sealing sleeves 141a and 141b, which are adapted to fit in the gaps 128a and 128b, respectively, between the edges of the major holes 28b, 28c of the side dishes 24, 25 and the peripheral surfaces 127a and 127b of the driving members. Provided in the said gaps 128a and 128b, the sealing sleeves 141a and 141b shall seal between the edge of the major hole 28b in the first dish 24 and the steel disc 129a, and between the edge of the major hole 28c in the second dish 25 and the opposite steel disc 129b. The two annular sealing sleeves 141a and 141b are connected with one another through a web section 142 and have the shape of lips, extending in opposite axial directions, turned slightly inwards in the radial direction. The width of the web section 142 corresponds to the internal width of the tool carrier, such that the web section 142 will fit in the front rim sections 40a, 41a of the tool carrier, FIG. 26. The web section 142 extends around-somewhat more than half the circumference of the sealing element 140, leaving an opening 143 between the sealing sleeves 141a, 141b within a region of nearly half the circumference of the sealing element 140. A pair of mounting lugs 144a, 144b are symmetrically provided on the sealing sleeves 141a, 141b in said region, extending outwards in the radial direction from the sleeves. Each mounting lug is provided with two mounting pins 145a, 145b, directed axially inwards, fitting the small holes 59a, 59b in the side dishes 24 and 25, respectively. The sealing element 140 is mounted in the tool carrier prior to mounting the tool assembly, whereupon the V-belt is guided through the opening 143, where the V-belt can run freely during operation. Finally the tool units are mounted as described in the foregoing, wherein the steel discs 129a and 129b of the tools 16a and 16b, respectively, are pressed against the sealing sleeves, efficiently sealing the gaps 128a and 128b, respectively. The sealing element 140 is made of a plastic material, which has a suitable combination of stiffness and resilience for its functioning as sealing element. It also has some wear resistance, although it should be regarded as a replacement element. Replacement suitable is performed in connection with replacement of the tool units.

What is claimed is:

1. A cutting machine comprising:
an elongate tool carrier mounted to a machine body at a machine-proximate end and having a rotatable cutting tool mounted at a distal end thereof;
a drive member positioned adjacent to and concentric with the rotatable cutting tool at the distal end of the tool carrier, the drive member being mounted on a rotatable bearing assembly received in an aperture at the distal end of the elongate tool carrier;

a machine-proximate receiving space defined between two side walls of the elongate tool carrier, said machine-proximate receiving space configured to accommodate a continuous drive loop power transmission operatively engaged between the drive member and a drive motor at the machine body, said machine-proximate receiving space extending from the machine body to at least a perimeter of the rotatable cutting tool;

a distal receiving space defined between two side walls of the rotatable cutting tool, said distal receiving space configured as an extension of the machine-proximate receiving space, said machine-proximate receiving space and said distal receiving space together constituting a protective operational space for a continuous drive loop power transmission operatively engaged between the drive member and a drive motor at the machine body; and at least one side of the elongate tool carrier has at least one rim section formed thereon to form a shelter for the power transmission.

2. The machine as recited in claim 1, wherein each side wall of the elongate tool carrier extends within the two side walls of the rotatable cutting tool and has a terminus end located at least half-way across a radius of the rotatable cutting tool.

3. The machine as recited in claim 1, wherein the power transmission comprises one of a drive chain and a drive belt and the power transmission operates within a plane covered by the machine-proximate receiving space and the distal receiving space.

4. The machine as recited in claim 3, wherein the bearing is located essentially within said plane.

5. A machine according to claim 3, wherein at least one side wall of the elongate tool carrier is at least partially detachable from the elongate tool carrier to simplify service or exchange of parts of the power transmission.

6. A machine according to claim 1, wherein the drive member consists of two halves, each having a peripheral portion and a central portion with an annular recess therebetween that creates a space for the bearing assembly, each half of the drive member is secured to the other at its central portion so that the bearing assembly is located essentially radially inside of the drive member, each peripheral portion of each half of the driving member is configured to be in a complimentary orientation to the other when the two halves are secured, thereby a groove is formed for cooperation with the power transmission via a drive belt or drive chain.

7. A machine according to claim 1, wherein a central member is housed by the elongated tool carrier and connected thereto by a plurality of sites, the central member further having a distal end configured to accept the bearing assembly within an aperture, the central member aperture being aligned with the elongated tool carrier aperture.

8. A machine according to claim 1, wherein a wear protector is provided on the front of the elongate tool carrier.

9. A cutting machine comprising:

an elongate tool carrier mounted to a machine body at a machine-proximate end and having a rotatable cutting tool mounted at a distal end thereof;

a drive member positioned adjacent to and concentric with the rotatable cutting tool at the distal end of the tool carrier, the drive member being mounted on a rotatable bearing assembly received in an aperture at the distal end of the elongate tool carrier;

a machine-proximate receiving space defined between two side walls of the elongate tool carrier, said machine-proximate receiving space configured to accommodate a continuous drive loop power transmission operatively engaged between the drive member and a drive motor at the machine body, said machine-proximate receiving space extending from the machine body to at least a perimeter of the rotatable cutting tool;

a distal receiving space defined between two side walls of the rotatable cutting tool, said distal receiving space configured as an extension of the machine-proximate receiving space, said machine-proximate receiving space and said distal receiving space together constituting a protective operational space for a continuous drive loop power transmission operatively engaged between the drive member and a drive motor at the machine body; and the drive member consists of two halves, each having a peripheral portion and a central portion with an annular recess therebetween that creates a space for the bearing assembly, each half of the drive member is secured to the other at its central portion so that the bearing assembly is located essentially radially inside of the drive member, each peripheral portion of each half of the driving member is configured to be in a complimentary orientation to the other when the two halves are secured, thereby a groove is formed for cooperation with the power transmission via a drive belt or drive chain.

10. A cutting machine comprising:

an elongate tool carrier mounted to a machine body at a machine-proximate end and having a rotatable cutting tool mounted at a distal end thereof;

a drive member positioned adjacent to and concentric with the rotatable cutting tool at the distal end of the tool carrier, the drive member being mounted on a rotatable bearing assembly received in an aperture at the distal end of the elongate tool carrier;

a machine-proximate receiving space defined between two side walls of the elongate tool carrier, said machine-proximate receiving space configured to accommodate a continuous drive loop power transmission operatively engaged between the drive member and a drive motor at the machine body, said machine-proximate receiving space extending from the machine body to at least a perimeter of the rotatable cutting tool;

a distal receiving space defined between two side walls of the rotatable cutting tool, said distal receiving space configured as an extension of the machine-proximate receiving space, said machine-proximate receiving space and said distal receiving space together constituting a protective operational space for a continuous drive loop power transmission operatively engaged between the drive member and a drive motor at the machine body; and a central member is housed by the elongated tool carrier and connected thereto by a plurality of sites, the central member further having a distal end configured to accept the bearing assembly within an aperture, the central member aperture being aligned with the elongated tool carrier aperture.

* * * * *